(12) United States Patent
Stanton et al.

(10) Patent No.: US 12,208,526 B2
(45) Date of Patent: Jan. 28, 2025

(54) PICK QUALITY DETERMINATION

(71) Applicant: AMP Robotics Corporation, Louisville, CO (US)

(72) Inventors: Matthew Stanton, Denver, CO (US); Jacob Fitzgerald, Wheat Ridge, CO (US); Jeffrey Stenberg, Broomfield, CO (US); Jason M. Calaiaro, Denver, CO (US); Carter J. Schultz, Lafayette, CO (US); John C. McCoy, Jr., Broomfield, CO (US); Kevin Taylor, Boulder, CO (US); Brian J. Leach, Denver, CO (US); Peter March, Arvada, CO (US); Joseph M. Castagneri, Denver, CO (US); Brendan Edward Richards, Columbia, MD (US)

(73) Assignee: AMP Robotics Corporation, Louisville, CO (US)

(*) Notice: Subject to any disclaimer, the term of this patent is extended or adjusted under 35 U.S.C. 154(b) by 0 days.

(21) Appl. No.: 18/448,658

(22) Filed: Aug. 11, 2023

(65) Prior Publication Data
US 2024/0058965 A1 Feb. 22, 2024

Related U.S. Application Data

(60) Provisional application No. 63/459,895, filed on Apr. 17, 2023, provisional application No. 63/399,368, filed on Aug. 19, 2022.

(51) Int. Cl.
*B25J 9/16* (2006.01)
*B07C 5/342* (2006.01)
(Continued)

(52) U.S. Cl.
CPC ............ *B25J 9/1674* (2013.01); *B07C 5/342* (2013.01); *B25J 9/0093* (2013.01); *B25J 9/161* (2013.01);
(Continued)

(58) Field of Classification Search
CPC ...... B07C 5/342; B07C 5/3422; B25J 9/1674; B25J 15/0616; B25J 19/0066
See application file for complete search history.

(56) References Cited

U.S. PATENT DOCUMENTS 10,634,243 B2 * 4/2020 Defranceski .......... F16H 61/433
2008/0029444 A1 2/2008 Mallett
(Continued)

FOREIGN PATENT DOCUMENTS

WO 2022090623 5/2022

*Primary Examiner* — Michael McCullough
*Assistant Examiner* — Jessica L Burkman
(74) *Attorney, Agent, or Firm* — Van Pelt, Yi & James LLP

(57) ABSTRACT

Pick quality determination is disclosed, including: using a pressure meter to sense a pressure associated with an airflow through a gripper mechanism of a diverting mechanism over time during a pick operation on a target object; storing the sensed pressure associated with the airflow through the gripper mechanism over time as a pressure sequence associated with the pick operation on the target object; and correlating the pressure sequence with representative pressure sequences associated with corresponding pick quality types to determine whether the pick operation on the target object was successful or not.

20 Claims, 22 Drawing Sheets

(51) Int. Cl.

| | | |
|---|---|---|
| *B25J 9/00* | (2006.01) | |
| *B25J 15/06* | (2006.01) | |
| *B25J 19/00* | (2006.01) | |
| *G06V 10/82* | (2022.01) | |
| *G06V 20/64* | (2022.01) | |

(52) U.S. Cl.
CPC ............ *B25J 9/1612* (2013.01); *B25J 9/163* (2013.01); *B25J 9/1697* (2013.01); *B25J 15/0616* (2013.01); *B25J 15/0683* (2013.01); *B25J 19/0066* (2013.01); *G06V 10/82* (2022.01); *G06V 20/64* (2022.01); *G06V 2201/06* (2022.01); *G06V 2201/07* (2022.01)

(56) References Cited

U.S. PATENT DOCUMENTS

| | | |
|---|---|---|
| 2015/0052990 A1 | 2/2015 | Dunkmann |
| 2017/0341880 A1 | 11/2017 | Strobel |
| 2023/0064484 A1* | 3/2023 | Nakashima ............ B23P 19/06 |

* cited by examiner

Input Image A                Predicted Pick Probability Heat Map A

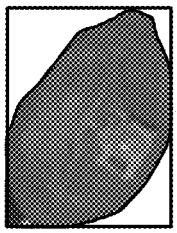 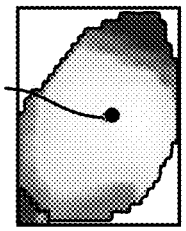

Selected Pick Location — Successful Pick Operation

Input Image B                Predicted Pick Probability Heat Map B

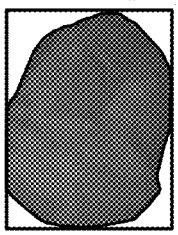 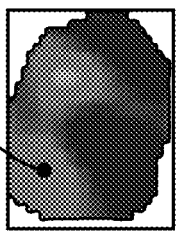

Selected Pick Location — Failed Pick Operation

Input Image C                Predicted Pick Probability Heat Map C

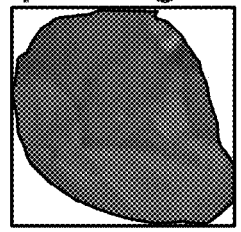 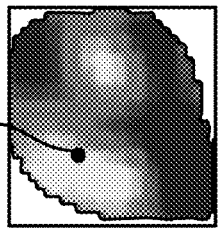

Selected Pick Location — Failed Pick Operation

Input Image D                Predicted Pick Probability Heat Map D

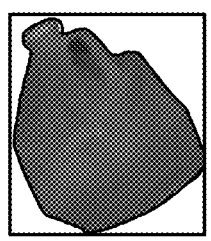 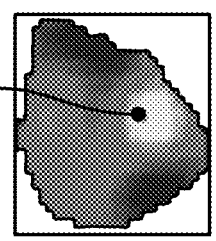

Selected Pick Location — Failed Pick Operation

Input Image E                Predicted Pick Probability Heat Map E

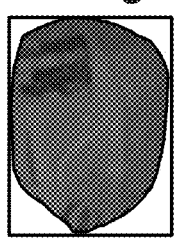 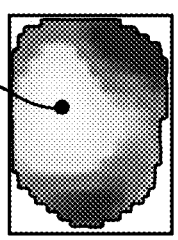

Selected Pick Location — Successful Pick Operation

Input Image F                Predicted Pick Probability Heat Map F

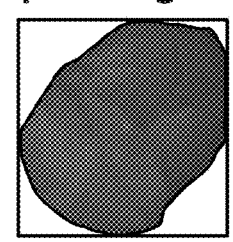 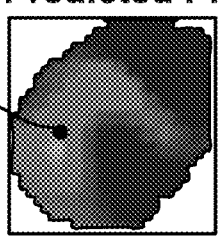

Selected Pick Location — Failed Pick Operation

FIG. 20

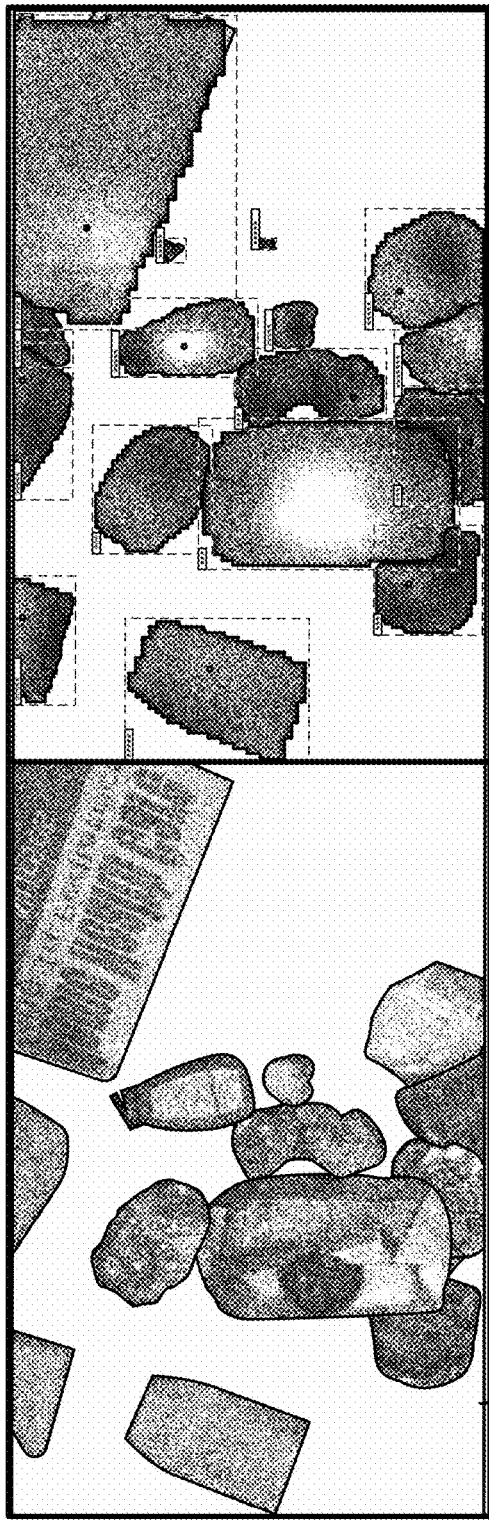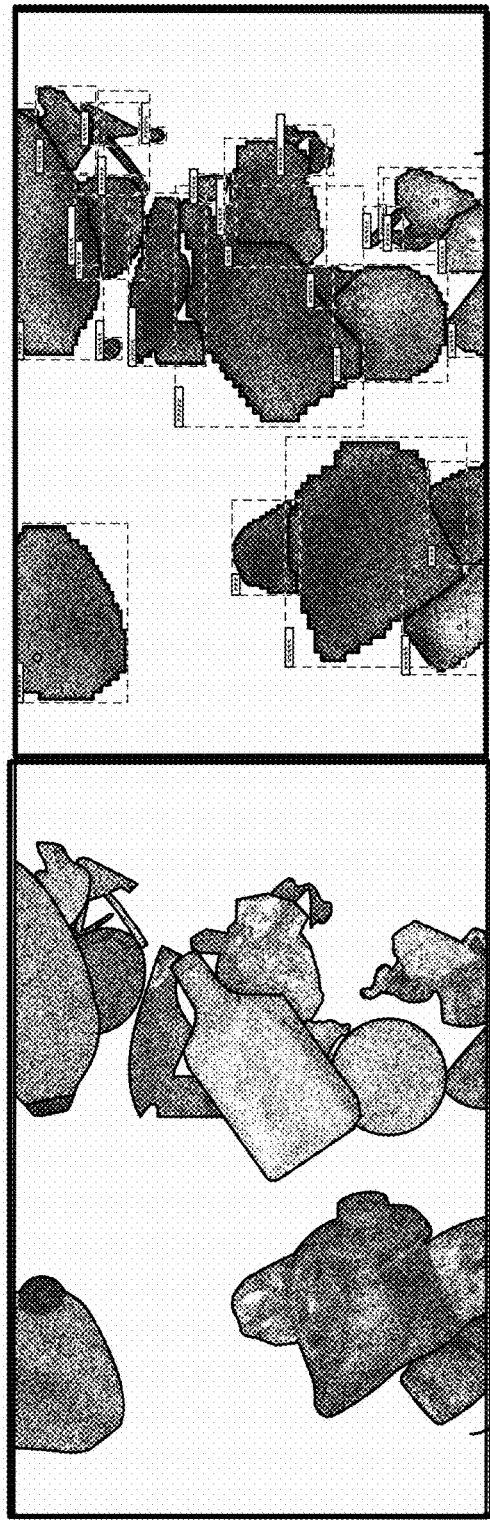
FIG. 21A
FIG. 21B

PICK QUALITY DETERMINATION

CROSS REFERENCE TO OTHER APPLICATIONS

This application claims priority to U.S. Provisional Patent Application No. 63/399,368 entitled GRIP DETECTION IN OBJECT SORTING filed Aug. 19, 2022 which is incorporated herein by reference for all purposes.

This application claims priority to U.S. Provisional Patent Application No. 63/459,895 entitled GRIP LOCATION OPTIMIZATION filed Apr. 17, 2023 which is incorporated herein by reference for all purposes.

BACKGROUND OF THE INVENTION

Artificial intelligence (AI) systems (coupled to imaging sensors) can be used to rapidly recognize objects based on image training and subsequent "learning" techniques (e.g., machine learning). For example, in the material recycling industry, such AI systems have been used successfully and incorporated in both optical sorters and robotic sorters. In these situations, a specific diverting mechanism (e.g., robotic arms, air jets, etc.) is directly coupled to one or more cameras and a machine learning (ML) processing system, and typically is used as a sorting device to identify and separate materials. Even in these simple cases (e.g., where there is a one-to-one mapping between ML vision systems and diverting mechanisms), it is desirable to measure the success or failure of "pick" actions, which are the action of a diverting mechanism removing an object off of a surface (e.g., conveyor belt). In more complicated systems, with multiple diverting mechanisms, vision systems, or both, tracking the success or failure of pick actions becomes critical. Understanding pick failures, statistics, and causal events is crucial in enabling the system to learn both better behaviors to prevent future failures, and to ideally correct failures when they do occur. Therefore, there exists a need for sorting systems that incorporate a feedback mechanism to evaluate pick performance of diverting mechanisms.

BRIEF DESCRIPTION OF THE DRAWINGS

Various embodiments of the invention are disclosed in the following detailed description and the accompanying drawings.

FIG. 20 is a diagram showing examples of input images of target objects, their corresponding predicted pick probability heat maps, and annotations of whether the pick operations that were performed using the predicted pick probability heat maps were successful or not.

FIGS. 21A and 21B show two example input images and corresponding output predicted pick probability heat maps.

DETAILED DESCRIPTION

Figure 1:
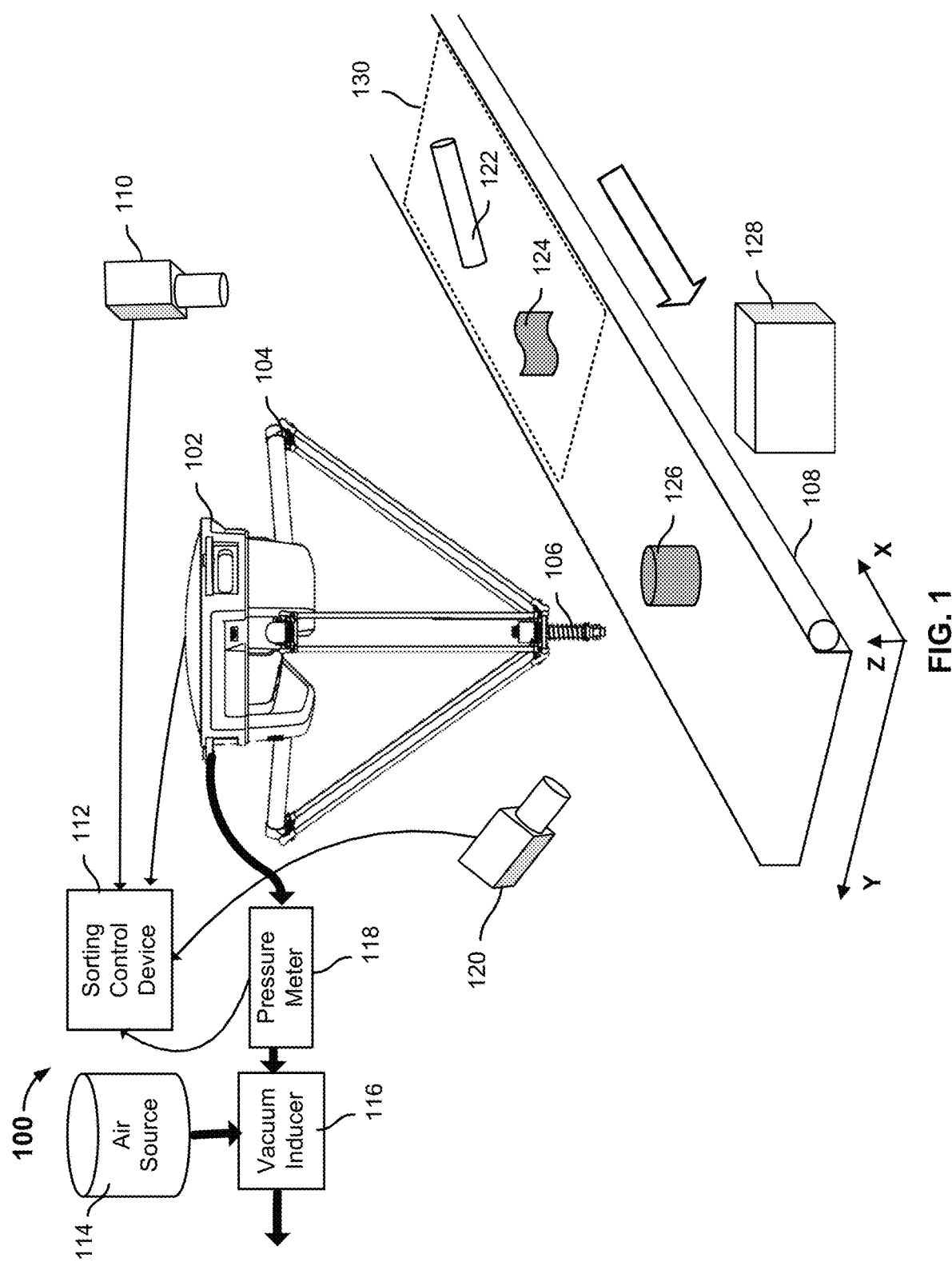
FIG. 1 is a diagram showing an embodiment of a sorting system for object pick optimization.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In an artificial intelligence (AI) assisted material sorting facility, sensed data (e.g., captured images) of objects are analyzed to identify those that match target object criteria as "target objects" to remove from conveyor devices and into deposit locations. In the robotics sorting space, typical robots do not have an efficient means of determining if a targeted object was properly picked up or placed appropriately in a corresponding deposit location. This problem is especially hard to solve in industrial areas where objects are non-uniform and hard to grasp. Solving this problem breaks down into two parts: verification of pick, and verification of proper placement. Diverting mechanisms that are located around the material sorting facility are configured to perform a "pick operation" on a target object that is transported by a conveyor device to remove the target object from the conveyor device and into a deposit location. A "pick" operation on a target object is sometimes referred to as a "grip" action on the target object when the pick operation is assisted by a suction/vacuum airflow that pulls the object towards the diverting mechanism, such as a robotically actuated suction gripper mechanism that channels a vacuum airflow and includes a suction cup. As such, evaluating the quality of a pick operation (e.g., whether the pick operation was successful in removing the target object from the conveyor device) is also sometimes referred to as evaluating the diverting mechanism's "grip" quality.

Embodiments of pick quality determination are described herein. A pressure sequence that describes the pressure of (e.g., vacuum) airflow through a gripper mechanism over time during a pick operation of a target object is obtained. The pressure sequence is correlated with a stored set of representative pressure sequences associated with corresponding pick qualities to determine whether the pick operation of the target object was successful. As will be described in further detail below, the recorded pressure sequence associated with the vacuum-assisted pick operation of a target object can be used to (e.g., programmatically) evaluate the pick quality (e.g., success or failure) of the pick operation. Either the pick success or pick failure of the specific pick operation can be used as feedback to improve a subsequent pick operation on the same target object, trigger the maintenance of sorting hardware, and/or train a machine learning model to predict appropriate sorting parameters to successfully perform a future pick operation on another target object.

The usefulness of systems utilizing machine vision to direct material diverting mechanisms may be measured with the rate at which they successfully pick target objects and ignore non-target objects. There are multiple factors leading to an ultimate success metric, e.g., neural architecture, vision system optics, robotics systems, and control algorithms. Various embodiments described herein address the need for such a system to effectively target an object in a manner most conducive to a successful pick (e.g., in which a diverting device successfully captures a target object).

Pick success rate is a key metric in assessing the performance of any sorting system. A common failure case in integrated machine learning vision (MLV)/robotics systems manifests when a diverting mechanism (e.g., one or more of a robotic arm, an array of air jets, a suction gripper mechanism, etc.) attempts to manipulate an object but fails due to the manipulation approach. By way of example, a robotic arm with a vacuum-assisted capture element (e.g., a suction gripper mechanism) may attempt to lift an object (e.g., grip a target object and remove it from the conveyor belt), but fail due to a projection, irregularity, or other surface element on the object that prevents a successful vacuum seal. Similarly, an array of air jet system may fail to create a satisfactory pressure profile to capture an object due to the object's orientation that results in having unfavorable exposure angles relative to air streams emitted by the air jet array. There exists a need for an integrated MLV/diverting system which can optimally target each object based upon its exposed surface geometry. Furthermore, it would be desirable for such a system to learn which approaches may work for various objects in any orientation relative to the diverting mechanism.

Embodiments of pick location optimization are described herein. In various embodiments, historical pick locations on surfaces of historical target objects at which suction gripper mechanisms have engaged with the historical target objects are recorded. For example, the historical pick locations and the respective pick qualities of the historical target objects (e.g., whether these target objects were successfully removed from the conveyor device by the suction gripper mechanisms) are annotated on images of the historical target objects. The images of the historical target objects annotated with the historical pick locations are used to train a machine learning model. A pick location along a surface of a new target object is selected by the machine learning model based on an input image of the new target object. Various embodiments incorporate object pick success and failure cases into the learning equation, and augment the machine learning architecture to couple positional capture cases with object recognition.

In various embodiments, a machine learning approach to evaluating and improving the probability of success of object captures of heterogeneous materials are described herein. Embodiments of such an approach may be utilized for the effective sorting of any type of material including but not limited to packages of different types, municipal solid waste, single stream recyclables, dual stream recyclables, e-waste, construction and demolition waste, luggage, components on an assembly line, produce, mining, sorting of organics or food materials, compost streams, or other forms of recycling. To illustrate the applicability of various embodiments described herein, a recycling system will be used as a primary example for the machine learning (ML)-based sorting system including a feedback mechanism for determining the quality and also increasing the chance of success of pick operations associated with diverting mechanisms.

FIG. 1 is a diagram showing an embodiment of a sorting system for object pick optimization. In the example sorting system 100 of FIG. 1, objects such as objects 122, 124, and 126 are being transported within a sorting facility on conveyor device 108. As the objects are being conveyed, object recognition device 110, which is located over conveyor device 108 and points down on the surface of conveyor device 108, is configured to periodically capture sensed data of the objects within its field of view 130 on the surface of conveyor device 108. For example, object recognition device 110 may comprise one or more sensors capable of generating data indicative of properties of the materials to be sorted. Such sensors may be capable of detecting a visual or non-visual electromagnetic spectrum. By way of example, one such sensor can be a camera capable of detecting images in a human-visible spectrum or infrared spectrum. Hyperspectral sensors capable of detecting various material signatures in non-visible spectra could also be used. Inductive, magnetic, or capacitive sensors, either singular or in an array, could also be used. Depth sensors, based on time of flight or stereoscopic imagery, among other techniques, could also be used. These signals could be used singularly or in combination by the recipient device, sorting control device 112, as will be described further below. For the purpose of illustration, object recognition device 110 comprises a camera that is configured to output an overhead image of the object(s) within field of view 130 on the surface of conveyor device 108.

Object recognition device 110 is configured to output its sensed data/signals (e.g., an overhead image of objects) to sorting control device 112. In various embodiments, sorting control device 112 comprises one or more computer processors and memories. The processor(s) are configured to execute software, firmware, or FPGA-type instructions to implement the necessary logic and machine learning software needed to operate the sorting system. In some embodiments, sorting control device 112 executes one or more of the following types of software: a neural network algorithm, reinforcement learning algorithm, support vector machine, regression (logistic or otherwise), Bayesian inference, and other statistical techniques. In particular, sorting control device 112 is configured to run one or more machine learning models that are configured to identify object(s) within the image received from object recognition device 110. For example, the machine learning model(s) running at sorting control device 112 are configured to determine the location of (e.g., the bounding box around) objects and the features of the objects in the received image. Sorting control device 112 is configured to compare the determined object features to target object criteria to determine those object(s) that match the criteria as "target objects." "Target objects" are objects which sorting control device 112 is to instruct a diverting mechanism, which is located downstream from object recognition device 110, to perform pick operations on and to deposit the picked up objects into a deposit location such as deposit container 128. The sensed data/signals (e.g., overhead image) that are captured by object recognition device 110 of the objects show them in approximately the same location/orientation on the surface of conveyor device 108 as they will be in when they reach the pick region that is reachable by robot 102 and suction gripper mechanism 106.

In the example of FIG. 1, the diverting mechanism comprises robot 102 with arms such as 104 that actuate suction gripper mechanism 106 through three-dimensional (3D) space (as defined by the X, Y, and Z axes) to perform pick operations on target objects that are conveyed within a pick region (not shown in FIG. 1) on the surface of conveyor device 108. For example, a suction gripper mechanism 106 is coupled to arms 104 of robot 102 and comprises at least a hollow linear shaft that communicates airflow from air source 114 and a suction cup for gripping a target object. During the performance of a pick operation, robot 102 is configured to position suction gripper mechanism 106 to a location in 3D space in proximity to a target object on conveyor device 108. Also, during a pick operation, suction gripper mechanism 106 is configured to channel a vacuum airflow to grip (e.g., with a suction cup in addition to the assistance of the vacuum) the target object off from conveyor device 108. The pressurized airflow that is channeled through suction gripper mechanism 106 is provided by air source 114 and the suction/vacuum direction of the pressured airflow is created by vacuum inducer 116. Sorting control device 112 is configured to instruct robot 102 and suction gripper mechanism 106 to perform a pick operation on a target object according to a set of sorting parameters. Examples of sorting parameters include the pick location on an exposed surface of the target object, the air pressure (e.g., as generated by the vacuum inducer), the robot speed (e.g., along the X, Y, and/or Z axes), the robot acceleration (e.g., along the X, Y, and/or Z axes), the height (e.g., along the Z axis) at which the suction gripper mechanism hovers when it drops off a picked up object, a blow off time (e.g., the timespan in which to release a picked up object), and a conveyor belt speed.

In various embodiments, pressure meter 118 is connected to vacuum inducer 116 in the airflow's path to measure the pressure of the vacuum airflow through suction gripper mechanism 106 over time. Pressure meter 118 is configured to sense the change in pressure in the vacuum airflow across the duration of a pick operation on a target object by robot 102 and suction gripper mechanism 106. In particular, pressure meter 118 is configured to record a "pressure sequence" associated with the pressure in the vacuum airflow across the duration of a pick operation on a target object by robot 102 and suction gripper mechanism 106 and where the "pressure sequence" comprises a series of pressure readings over time. In various embodiments, sorting control device 112 is configured to evaluate the recorded pressure sequence corresponding to a performed pick operation to infer a pick quality of the pick operation. Example types of pick qualities include good grips, bad grips, and dropped grips. For example, as a good grip is made, the flow of pressure drops from the steady state pressure or flow to a lower state as a vacuum is formed and the flow caused by the vacuum is diminished. Also, for example, a bad grip can be identified when the pressure or flow drops slightly and returns to the steady state. For example, a bad grip can be caused by the suction gripper mechanism being jammed, by a broken suction cup attachment on the suction gripper mechanism, by broken air hoses (e.g., that are identified with lower than normal vacuum readings when picking), by broken air valves (e.g., that is indicated by improper airflow based on system baseline—e.g., air flowing while no pick is being made), and/or by the suction gripper mechanism engaging with a surface of the target object with which a grip is difficult to establish (e.g., due to the contours/textures of that surface). As a further example, a dropped grip can be identified when the pressure drops significantly but then rapidly returns to the steady state. The type of pick quality can be used to determine whether the pick operation was successful (e.g., the target object was successfully removed from conveyor device 108) or not (e.g., the target object was not successfully removed from conveyor device 108). In some embodiments, sorting control device 112 evaluates the recorded pressure sequence corresponding to a performed pick operation by correlating the recorded pressure sequence against representative pressure sequences corresponding to given pick qualities and assigning the pick quality of the closest matching representative pressure sequence to that particular pick operation. For example, representative pressure sequences can be determined from a prior pick quality calibration period during which pick qualities of historical pick operations (e.g., that are performed by the diverting mechanism comprising robot 102 and suction gripper mechanism 106) can be manually determined based on images captured by quality control camera 120 during those historical pick operations, as will be described in further detail below. For example, images that are captured by quality control camera 120 may at least partially overlap with the images captured by object recognition device 110. In the event that sorting control device 112 determines that a pick operation of a target object is unsuccessful based on the corresponding pressure sequence (e.g., because the pressure sequence matches that of a bad grip or a dropped grip), in some embodiments, sorting control device 112 is configured to instruct a subsequent pick operation to be performed on the same (missed) target object as another attempt to successfully sort that object. For example, sorting control device 112 can instruct another diverting mechanism, one that is downstream from the diverting mechanism comprising robot 102 and suction gripper mechanism 106, in the sorting facility to perform a pick operation on the previously missed target object using sorting parameters that are (potentially) different than those that were used in the previous unsuccessful pick operation. After the completion of a pick operation, sorting control device 112 is configured to store data associated with an executed pick operation including, at least, whether the pick operation was unsuccessful or not, its determined pick quality, and the sorting parameters that were used.

In various embodiments, the sorting parameters that are determined by sorting control device 112 to use to perform a particular pick operation of a target object can be determined by applying a trained machine learning model on the sensed data (e.g., an overhead image) that is captured by object recognition device 110 of the target object. In particular, the sorting parameter of the "pick location," which is the location on a surface of the target object that is exposed to object recognition device 110 and suction gripper mechanism 106 on which suction gripper mechanism 106 is to contact/engage with the target object, can be selected based on predictions made by a machine learning model on regions of the target object that are more likely to result in a good grip and therefore, a successful pick operation. Such predictions of probabilities of successful pick operations corresponding to different locations/regions on an (e.g., overhead) image of a target object are sometimes referred to as a "pick location probability heat map." For example, a machine learning model that has been previously trained to identify individual objects and object features from an overhead image that is generated by object recognition device 110 can be further trained. During a pick location calibration period, this existing machine learning model can be further trained on images of individual objects for which historical pick operations have been performed and that are annotated with the pick locations used by the pick operations and also whether the respective pick operations were successful or not. Such annotated images of historical pick operations are sometimes referred to as "ground truth heat maps." For example, whether a historical pick operation was successful could have been programmatically determined based on the recorded pressure sequence corresponding to that pick operation, as described above. The machine learning model that has been trained on the overhead images of target objects that have been annotated with their historical pick locations and success/failure of their respective pick operations can then output a pick location probability heat map for an input overhead image (from object recognition device 110) of a new target object. Sorting control device 112 can then use the pick location probability heat map for this new target object to select a pick location sorting parameter for the diverting mechanism comprising robot 102 and suction gripper mechanism 106 to use to perform a pick operation on the target object and/or determine whether to prioritize the pick operation of this new target object relative to another new target object given the other new target object's pick location probability heat map.

In some embodiments, a machine learning model can be trained based on the stored data associated with historical, completed pick operations, which include the used sorting parameters and whether the pick operations were successful or not, to output sorting parameters for a pick operation that are predicted to result in a successful pick operation on a new target object given the input of an overhead image of that new target object.

In a sorting system such as sorting system 100, the determined pick quality type (and also whether the pick operation was successful or not) can serve as feedback, which could enable the system to alter its object recognition and/or control algorithms to ensure a higher percentage of overall successful picks. In a system with multiple diverting mechanisms, the data feedback could also provide information to enable the control system to select alternative vision or diverting mechanisms to target the missed object at a later stage in the same sorting facility.

While the example of FIG. 1 shows a diverting mechanism that includes robot 102 and suction gripper mechanism 106, other types of vacuum-assisted diverting mechanisms can be used to perform pick operations on target objects in a sorting system.

Figure 2:
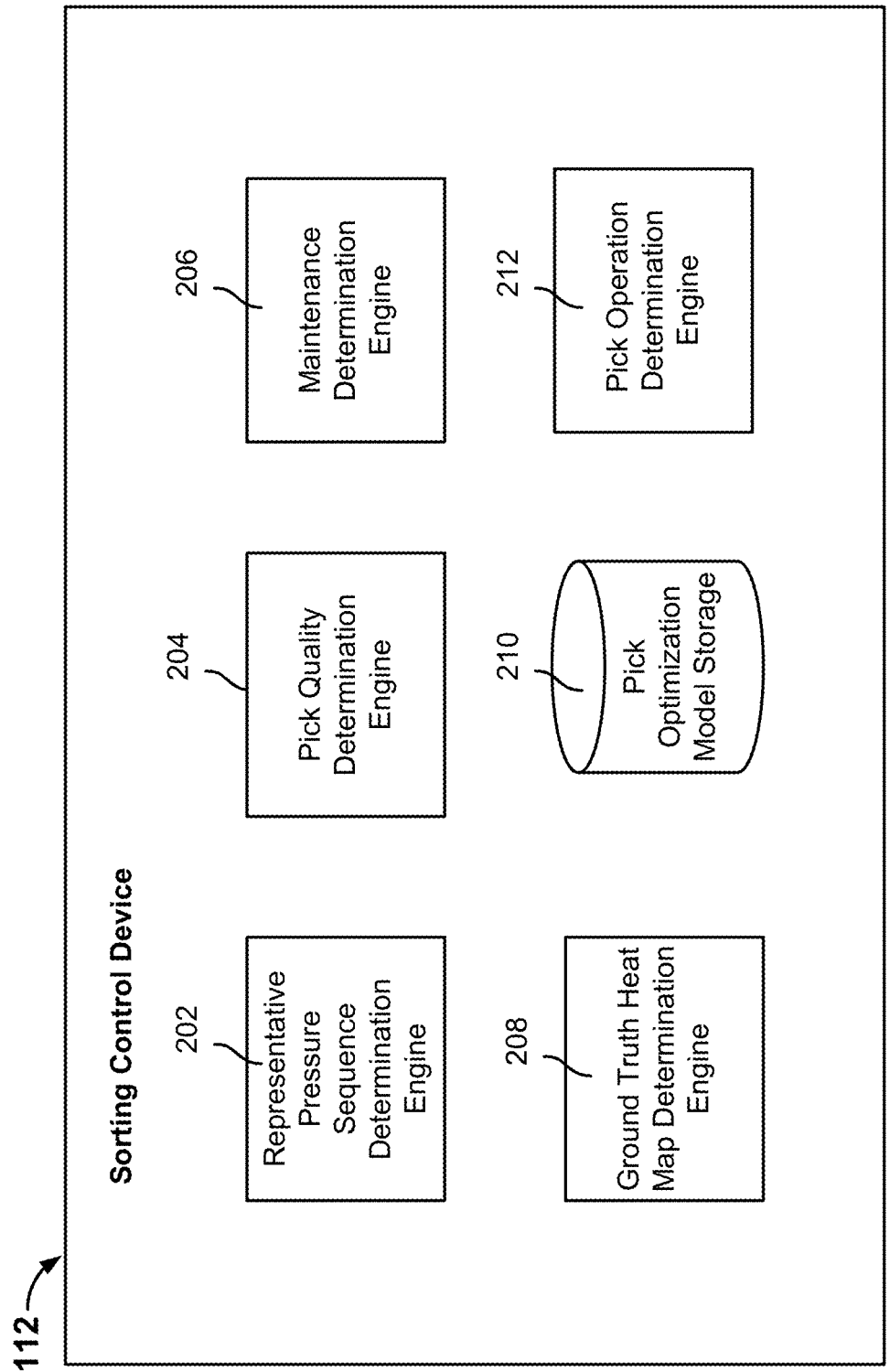
FIG. 2 is a diagram showing an example of a sorting control device in accordance with some embodiments.

FIG. 2 is a diagram showing an example of a sorting control device in accordance with some embodiments. In some embodiments, sorting control device 112 of sorting system 100 of FIG. 1 may be implemented using the example sorting control device of FIG. 2. As shown in FIG. 2, the example sorting control device includes representative pressure sequence determination engine 202, pick quality determination engine 204, maintenance determination engine 206, ground truth heat map determination engine 208, pick optimization model storage 210, and pick operation determination engine 212. Each of representative pressure sequence determination engine 202, pick quality determination engine 204, maintenance determination engine 206, ground truth heat map determination engine 208, pick optimization model storage 210, and pick operation determination engine 212 may be implemented using hardware and/or software.

Representative pressure sequence determination engine 202 is configured to determine a set of representative pressure sequences corresponding to each of one or more types of pick quality associated with pick operations that are performed by vacuum-assisted diverting mechanisms. Example types of pick quality include a good grip, a bad grip (e.g., due to a collapsed suction cup on the suction gripper mechanism), and a dropped grip (e.g., an object was initially gripped but was dropped before it could be deposited into a deposit location). In some embodiments, one or more types of pick quality can also be mapped to either a "pick success" determination (a successful pick operation in which a targeted object is removed from the conveyor device) or a "pick failure" determination (an unsuccessful pick operation in which a target object is not removed from the conveyor device). For example, a good grip type of pick quality could be mapped to a pick success determination and a bad grip or a dropped grip could be mapped to a pick failure determination. To determine representative pressure sequences, during a pick quality calibration period, representative pressure sequence determination engine 202 is configured to receive recorded pressure sequences (e.g., recorded by pressure meters that were in the path of airflow) of completed/historical pick operations (e.g., that were performed by a particular vacuum-assisted diverting mechanism) that were performed during a pick quality calibration period. Representative pressure sequence determination engine 202 is further configured to receive annotations or selections of those historical pick operations that correspond to each of one or more types of pick qualities. In a first example, the historical pick operations are manually annotated to be associated with a corresponding pick quality based on the annotator's reviewing images (e.g., video frames) captured by a quality control camera (e.g., quality control camera 120 of FIG. 1) that show the pick operations being carried out. For instance, if the images captured by the quality control camera showed that a historical pick operation was successfully completed (e.g., the suction gripper mechanism had gripped the target object and removed it from the conveyor device), then the recorded pressure sequence associated with that particular pick operation would be annotated to be that of a good grip (a pick success). Similarly, for example, if the images captured by the quality control camera showed that a historical pick operation was not successfully completed (e.g., the suction gripper mechanism had not gripped the target object and instead, the target object remained on the conveyor device), then the recorded pressure sequence associated with that particular pick operation would be annotated to be that of a bad grip (a pick failure). In a second example, the historical pick operations are annotated by a machine learning model that receives the quality control images of the pick operations as input and then outputs predictions of the pick quality types associated with the pick operations. The recorded pressure sequences of at least some of the historical pick operations associated with each type of pick quality are (e.g., manually) selected to be references against which pressure sequences of new pick operations are to be correlated during runtime. Representative pressure sequence determination engine 202 can either store the recorded pressure sequences of the selected historical pick operations directly as a set of representative pressure sequences for each pick quality type, or generate a derivation (e.g., an average) from the recorded pressure sequences of the selected historical pick operations to store as a representative pressure sequence for each pick quality type. In some embodiments, representative pressure sequence determination engine 202 can determine representative pressure sequence(s) for each pick quality type for all object types (e.g., plastic, aluminum, milk carton, cardboard) of the target objects that were involved in the historical pick operations from the pick quality calibration period. In some other embodiments, representative pressure sequence determination engine 202 can determine representative pressure sequence(s) for each pick quality type for each particular object of the target objects that were involved in the historical pick operations from the pick quality calibration period.

Pick quality determination engine 204 is configured to, at runtime, determine a pick quality type corresponding to a pick operation that is performed by a vacuum-assisted diverting mechanism based on the recorded pressure sequence associated with the change in airflow during the pick operation. As shown in the example system of FIG. 1, a pressure meter (pressure meter 118) can be placed in line with the flow of air through the vacuum-assisted diverting mechanism (e.g., suction gripper mechanism 106) to record the change in pressure in the airflow through the diverting mechanism over the course of a pick operation of a target object that is performed by the diverting mechanism. In various embodiments, the pressure sequence comprises a series of pressure readings corresponding to a respective series of points in time. In various embodiments, pick quality determination engine 204 is configured to correlate the newly recorded pressure sequence of the recent pick operation with representative pressure sequences corresponding to one or more pick quality types to determine a pick quality type that is associated with the recent pick operation. In a first example, pick quality determination engine 204 is configured to determine a statistical correlation value (e.g., a Pearson correlation coefficient) between the newly recorded pressure sequence of the recent pick operation with representative pressure sequence(s) corresponding to each of one or more pick quality types to determine the pick quality type with which the newly recorded pressure sequence most strongly correlates. In a second example, pick quality determination engine 204 is configured to determine a statistical correlation value between the newly recorded pressure sequence with representative pressure sequence(s) corresponding to each of one or more pick quality types and also apply heuristics (e.g., if the recorded pressure sequence starts with high pressure readings and ends with high pressure readings, then that could point to a dropped grip) to determine the pick quality type associated with the recent pick operation. In a third example, pick quality determination engine 204 is configured to input the newly recorded pressure sequence into a machine learning model that has been trained to predict a corresponding pick quality type for pressure sequences to determine the pick quality type associated with the recent pick operation. As mentioned above, each pick quality type can also map to a pick success or a pick failure and so pick quality determination engine 204 can determine whether the recent pick operation was successful or not based on the determined pick quality type. In various embodiments, pick quality determination engine 204 is configured to store data associated with each pick operation that was performed at runtime. Examples of the stored data associated with each pick operation that was performed at runtime may include one or more of the following: whether the pick operation of the target object was successful or not, the object type of the target object, and the sorting parameters that were executed by the diverting mechanism to perform the pick operation. As mentioned above, examples of sorting parameters may include one or more of the following: the pick location on an exposed surface of the target object, the air pressure, the robot speed (e.g., along the X, Y, and/or Z axes), the robot acceleration (e.g., along the X, Y, and/or Z axes), the height (e.g., along the Z axis) at which the suction gripper mechanism hovers when it drops off a picked up object, a blow off time, and a conveyor belt speed.

In some embodiments, pick quality determination engine 204 is configured to use a determination that a recent pick operation on a target object has failed as determined based on the recorded pressure sequence as feedback for instructing a diverting mechanism to perform subsequent pick operations. In a first example, pick quality determination engine 204 is configured to instruct a downstream diverting mechanism (e.g., a diverting mechanism that is located further down the sorting line from the diverting mechanism that had performed the failed pick operation) to perform another pick operation on the same target object that was previously not successfully picked. For instance, pick quality determination engine 204 is configured to instruct a downstream diverting mechanism to perform the subsequent pick operation on the same target object using modified sorting parameters relative to what was used in the failed pick operation. In a second example, pick quality determination engine 204 is configured to instruct the same diverting mechanism that had performed the failed pick operation to perform a new pick operation on a different target object using modified sorting parameters relative to what was used in the failed pick operation.

Maintenance determination engine 206 is configured to trigger hardware maintenance on one or more portions of the sorting system. In some embodiments, pick quality determination engine 204 is configured to send a message to maintenance determination engine 206 in the event that a set of maintenance criteria is met by a recent history of pick failures. For example, the set of maintenance criteria can dictate that if the last 10 pick operations that are performed by a diverting mechanism all result in pick failures (as determined from their respective recorded pressure sequences), then a message is to be sent to maintenance determination engine 206 to cause maintenance to be performed within the sorting system. In some embodiments, maintenance determination engine 206 is configured to periodically or in response to an event (e.g., the diverting mechanism has been idle for a predetermined length of time), cause a health check to be performed on the suction gripper mechanism. For example, to perform a health check, a vacuum is pulled through the diverting mechanism without the diverting mechanism attempting to perform a pick operation on a target object. Maintenance determination engine 206 is configured to correlate the recorded pressure sequence associated with this health check with a representative pressure sequence associated with a desirable airflow to determine whether the recorded pressure sequence deviates from this reference pressure sequence. If the deviation is greater than a threshold amount, then maintenance determination engine 206 is configured to cause maintenance to be performed within the sorting system. For example, types of maintenance that maintenance determination engine 206 can cause to be performed include sending a positive airflow through the suction gripper mechanism (e.g., to remove any potential clogs), replacing the suction cup with a new suction cup, and/or sending an alert to an operator to prompt for other types of repairs.

Ground truth heat map determination engine 208 is configured to obtain ground truth heat maps of objects, which are images of target objects on which pick operations were performed and where each image is annotated with the location (the "pick location") on an exposed surface of the target object on which a diverting mechanism had engaged the pick operation and annotated with whether the pick operation was successful or not. For example, the "pick location" annotation on an image of a target object is drawn/denoted on the region of an exposed area of the target object on which the suction cup of the suction gripper mechanism had contacted or directed (e.g., vacuum) airflow upon. In various embodiments, each ground truth heat map image comprises at least a portion of an overhead image of the surface of the conveyor device that was captured by the object recognition device (e.g., object recognition device 110 of FIG. 1) that is located upstream from the location of the diverting mechanism. In a first example, the pick location annotation on an image of a target object can be performed based on a predetermined location on the target object that is determined based on the identified object type associated with the target object. In a second example, the pick location annotation on an image of a target object can be performed by an annotator manually reviewing the video frames of the pick operation that were captured by a quality control camera (e.g., quality control camera 120 of FIG. 1). In a third example, the pick location annotation on an image of a target object can be performed by a machine learning model that has been trained to identify the pick location on the object from video frames of the pick operation that were captured by a quality control camera (e.g., quality control camera 120 of FIG. 1). In addition to the pick location, each ground truth heat map image of the target object is also annotated with whether the pick operation was successful or not. In a first example, whether the pick operation of the target object was successful or not can be determined based on a recorded pressure sequence corresponding to the pick operation, as described above. In a second example, whether the pick operation of the target object was successful or not can be determined by a machine learning model that has been trained to determine whether a pick operation on a target object was successful or not from video frames of the pick operation that were captured by a quality control camera (e.g., quality control camera 120 of FIG. 1).

A machine learning model (e.g., a neural network) is then trained using the annotated ground truth heat maps to infer pick success based on the historical locations of pick attempts on target objects. In some embodiments, a new (e.g., neural) model component (neural network head) is added to an existing machine learning model (e.g., neural network) that has been previously trained to recognize the locations, bounding boxes, features, types, etc., of objects from input images. This new model component is trained on the ground truth heat maps and is added as a new "head" to an existing, core object detection machine learning model so that it only runs when an identified object is recognized by the core object detection machine learning model. In some embodiments, a new model component is trained based on ground truth heat maps corresponding to objects of various identified object types. In some embodiments, a corresponding new model component is trained based on ground truth heat maps corresponding to objects of each different object type. In various embodiments, each new model component is configured to receive as input, an (e.g., overhead) image of an object (e.g., as captured by an object recognition device that is upstream from a diverting mechanism such as object recognition device 110 of FIG. 1) and to output a "pick location probability heat map" corresponding to the object identified within the image. As will be described in further detail below, a pick location probability heat map shows corresponding probabilities of a successful pick operation of the target object associated with different regions (potential pick locations) along the surface(s) of the target object that are exposed in the input image. In some embodiments, parameters associated with the core object detection machine learning model and the one or more model components that are trained to output pick probability heat maps are stored at pick optimization model storage 210.

Pick operation determination engine 212 is configured to determine which target objects a diverting mechanism is to perform pick operations on and using which sorting parameters. In various embodiments, pick operation determination engine 212 is configured to receive an overhead image of object(s) on a conveyor device from an objection recognition device (e.g., object recognition device 110 of FIG. 1) that is located upstream from a diverting mechanism (e.g., robot 102 and suction gripper mechanism 106 of FIG. 1) and input the image into a core object detection machine learning model (e.g., whose parameters are stored at pick optimization model storage 210) that has been trained to recognize the location and object types associated with objects that are present within the input image. Pick operation determine engine 212 can compare the object features (e.g., object types) that have been detected by the core object detection machine learning model to determine the at least subset that matches target object criteria and are therefore, target objects that should be picked/captured. As described above, the core object detection machine learning model can include additional components (e.g., neural network heads) that can use the portion of the image that includes an identified target object and output a pick location probability heat map corresponding to that target object. In various embodiments, pick operation determination engine 212 is configured to use the respective pick location probability heat map corresponding to one or more target objects that are approaching the pick region of a diverting mechanism to determine which target objects that the diverting mechanism will target in a pick operation and if so, which sorting parameters to use in the pick operation. In a first example, if the pick location probability heat map corresponding to a first target object indicates fewer candidate pick locations with higher (e.g., than a threshold) probabilities of successful pick operations, then pick operation determination engine 212 can determine to omit performing a pick operation on that first target object and instead perform a pick operation on a second target object that is approaching the diverting mechanism around the same time as the first target object and where the pick location probability heat map corresponding to the second target object indicates more candidate pick locations with higher (e.g., than a threshold) probabilities of successful pick operations. In a second example, pick operation determination engine 212 can use the pick location probability heat map corresponding to a target object to select a pick location (e.g., associated with the highest probability of a successful pick operation) on the target object as one of the sorting parameters to instruct a diverting mechanism to use in performing a pick operation on that target object.

In some embodiments, to optimize capture behavior, a machine learning component is trained with a combination of recognized objects, visual recognition of object captures and failures, and corresponding pressure traces for each event. In this way, the system couples object recognition with success and failure modes for object captures. When deployed, as objects are recognized by the machine learning vision system, it can then provide likely object capture approaches to the control system to enable a higher capture rate. Since pressure measurements/sequences have been correlated in the learning phase, the system also has the ability to utilize the pressure sequences in conjunction with the neural network to determine the success or failure of capture events, even in the absence of direct visual (e.g., camera) capture of the event. In particular, in some embodiments, pick optimization model storage 210 can further store parameters of a machine learning model that has been trained on stored data associated with completed pick operations. Examples of stored data associated with a completed pick operation include one or more of the following: an (e.g., overhead) image of the target object on which the pick operation was performed, the sorting parameters (e.g., including the pick location) executed by the pick operation, image(s) of the pick operation as it was performed by the diverting mechanism, and whether the pick operation was successful or not. By training a machine learning model on stored data associated with completed pick operations, the model can then take as input an (e.g., overhead) image of a target object and then output a set of sorting parameters that are predicted to result in a successful pick operation of the target object that is present within the input image. In various embodiments, the set of sorting parameters that is predicted by this model to result in a high probability of a successful pick operation can be thought of as a "recipe" for a diverting mechanism to follow.

Figure 3:
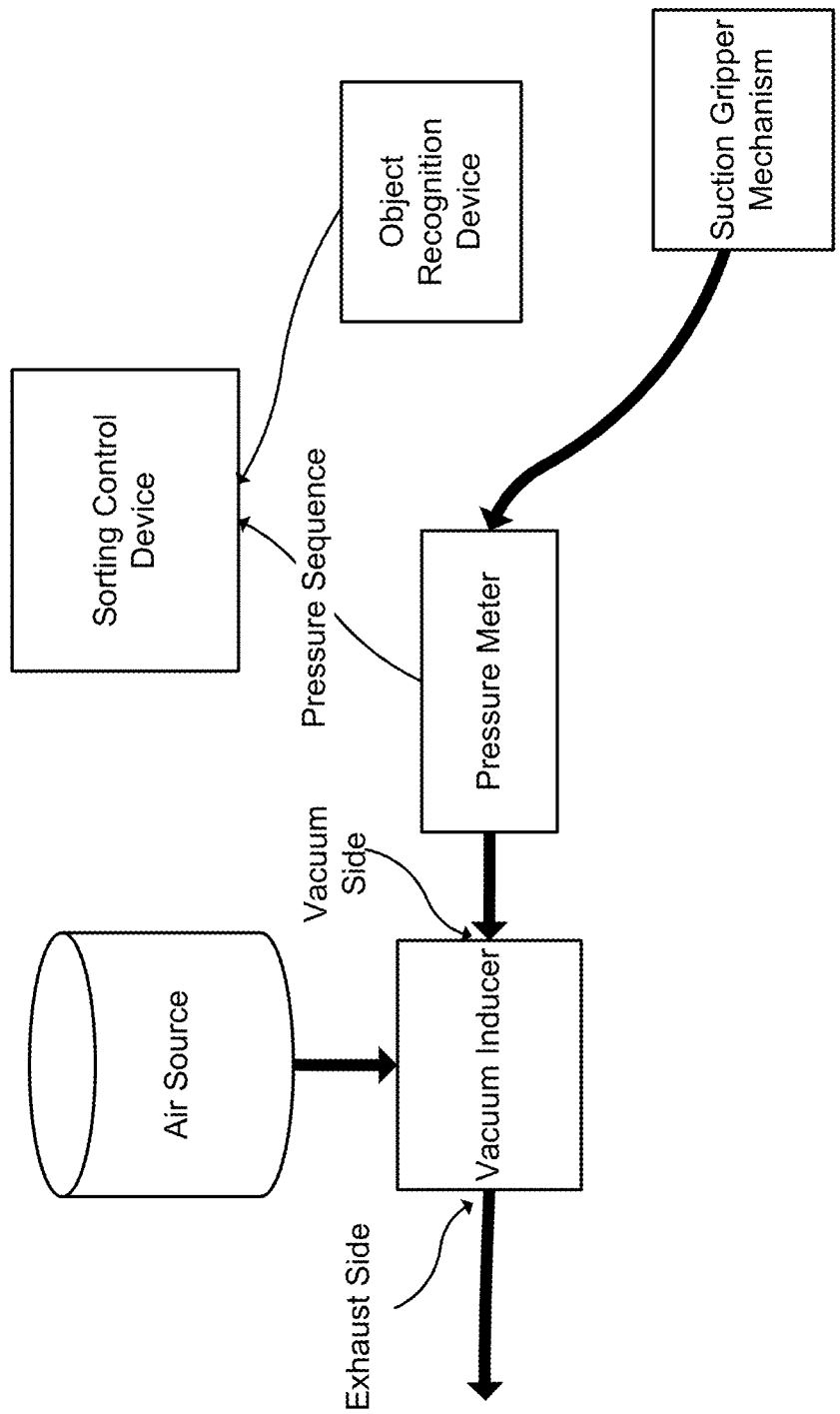
FIG. 3 provides an exemplary diagram of an example of a sorting system with a pressure measurement.

In some embodiments, a vacuum inducer in a sorting system, such as the system shown in FIG. 1, is connected to a flow or pressure meter. The flow or pressure meter in turn is connected to either the exhaust or vacuum side of the vacuum inducer to measure the pressure or flow. FIG. 3 provides an exemplary diagram of an example of a sorting system with a pressure measurement. The vacuum inducer may be implemented in a variety of ways (e.g., a duct fan or a Venturi approach). Pressurized air is generated and fed to the vacuum inducer, causing a negative (vacuum) pressure on the right side of the vacuum inducer as shown in FIG. 3, and positive (exhaust) pressure on the left side of the vacuum inducer as shown in FIG. 3. In FIG. 3, a pressure meter is installed in-line in the vacuum tubing feeding the vacuum side of the vacuum inducer. The pressure sequence measured from the flow or pressure meter in turn is fed back to the sorting control device for analysis of the signal. When objects are non-uniform or difficult to grasp, the task of identifying the success of a pick operation is comparatively more challenging.

Figure 4:
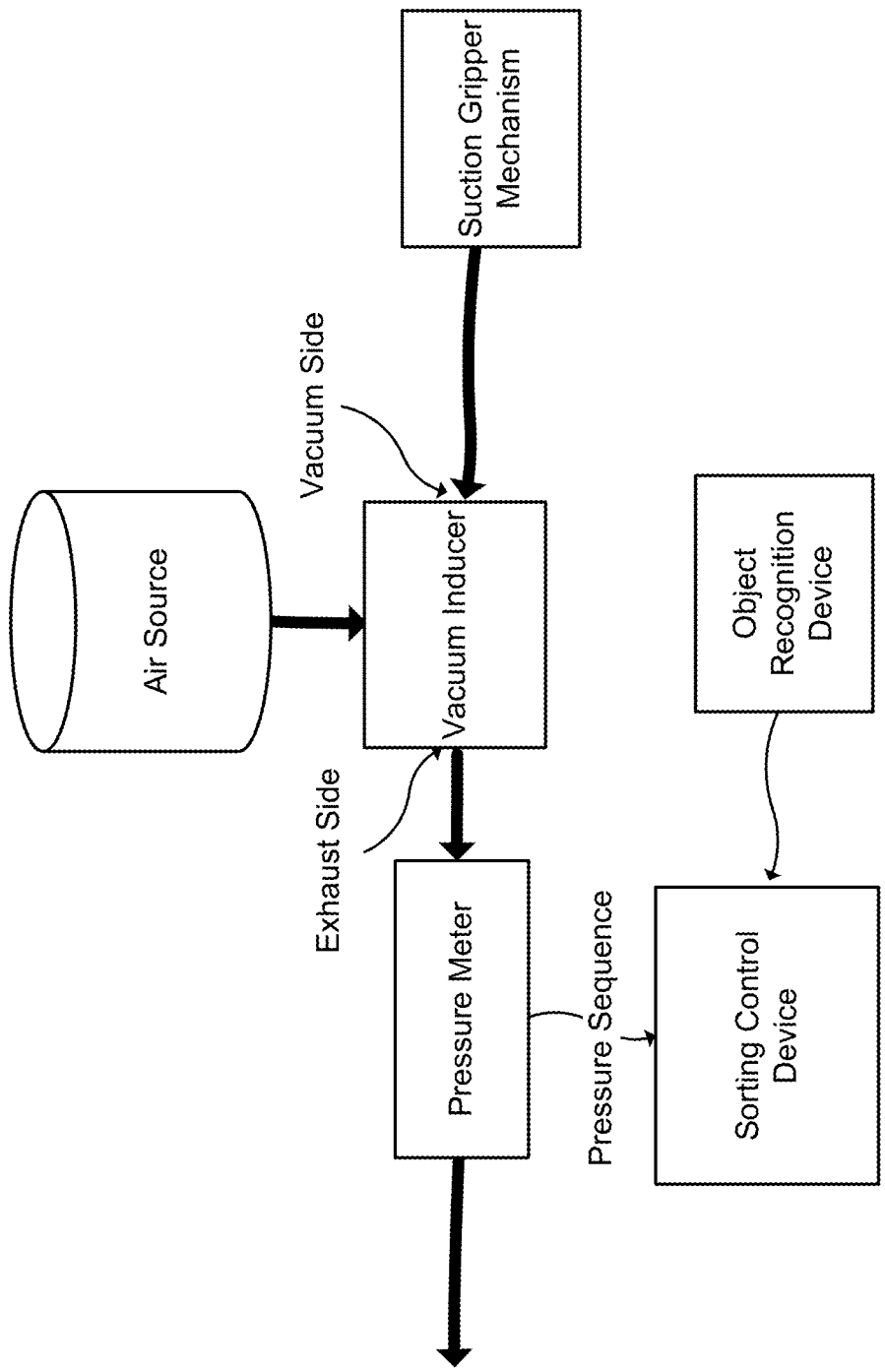
FIG. 4 provides an exemplary diagram of another example of a sorting system with pressure measurement.

FIG. 4 provides an exemplary diagram of another example of a sorting system with pressure measurement. As compared to the system shown in FIG. 3, in FIG. 4, the pressure meter is installed on the exhaust side of the vacuum inducer. However, the sorting system of FIG. 4 also has all the same components that are utilized in FIG. 3 and shares similar performance characteristics.

In some embodiments, air source 114, sorting control device 112, object recognition device 110, vacuum inducer 116, suction gripper mechanism 106, and pressure meter 118 of FIG. 1 can be arranged in either the configuration shown in FIG. 3 or the configuration shown in FIG. 4.

Figure 5:
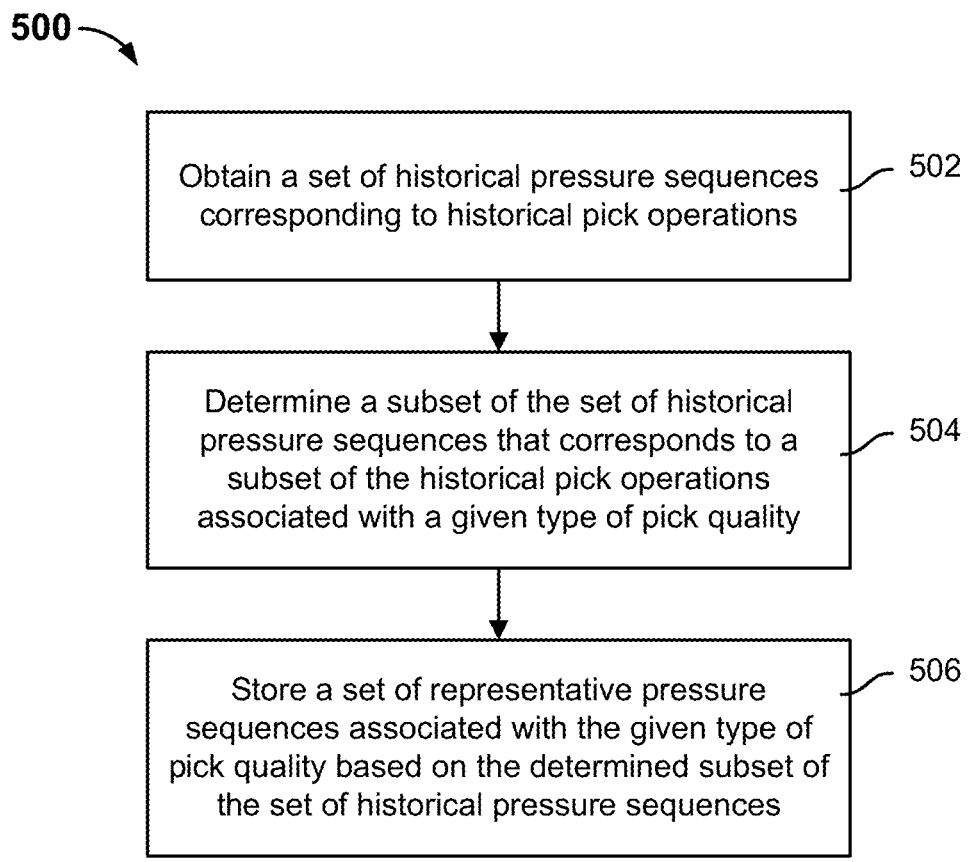
FIG. 5 is a flow diagram showing an example of a process for determining representative pressure sequences to a given type of pick quality in accordance with some embodiments.

FIG. 5 is a flow diagram showing an example of a process for determining representative pressure sequences to a given type of pick quality in accordance with some embodiments. In some embodiments, process 500 is implemented at a sorting system such as sorting system 100 of FIG. 1.

Process 500 may be performed during a pick quality calibration period (e.g., which occurs prior to evaluating recorded pressure sequences of pick operations at runtime). In some embodiments, instances of process 500 can be performed for different diverting mechanisms to determine diverting mechanism-specific representative pressure sequences.

At 502, a set of historical pressure sequences corresponding to historical pick operations is obtained. The pressure sequences that are measured by a pressure meter corresponding to the vacuum airflow through a vacuum-assisted diverting mechanism during historical pick operations are obtained.

At 504, a subset of the set of historical pressure sequences that corresponds to a subset of the historical pick operations associated with a given type of pick quality is determined. In some embodiments, the historical pick operations are each annotated with a corresponding pick quality type (e.g., good grip, bad grip, dropped grip). For example, a historical pick operation is annotated with a corresponding pick quality type by an annotator that manually reviews the video frames captured by the diverting mechanism performing the pick operation. In some embodiments, different pick quality types are assigned to either a pick success determination or a pick failure determination. After the annotation of pick quality, historical pick operations and their respective historical pressure sequences are grouped by their annotated pick quality types.

At 506, a set of representative pressure sequences associated with the given type of pick quality is stored based on the determined subset of the set of historical pressure sequences. The pressure sequences associated with the subset of historical pick operations that have been annotated with a given pick quality type are used to determine a set of representative pressure sequences associated with that given type of pick quality. For example, the set of representative pressure sequences associated with a given type of pick quality may be selected ones of the pressure sequences associated with the subset of historical pick operations that have been annotated with the given pick quality type. Or, the set of representative pressure sequences associated with a given type of pick quality may be determined as an average that is derived from the pressure sequences associated with the subset of historical pick operations that have been annotated with the given pick quality type.

In some embodiments, historical pick operations and their respective historical pressure sequences are grouped by the object types of the objects on which the pick operations were performed and then grouped by their annotated pick quality types so that ultimately, sets of representative pressure sequences associated with each given type of pick quality are separately determined for each distinct object type.

Figure 6:
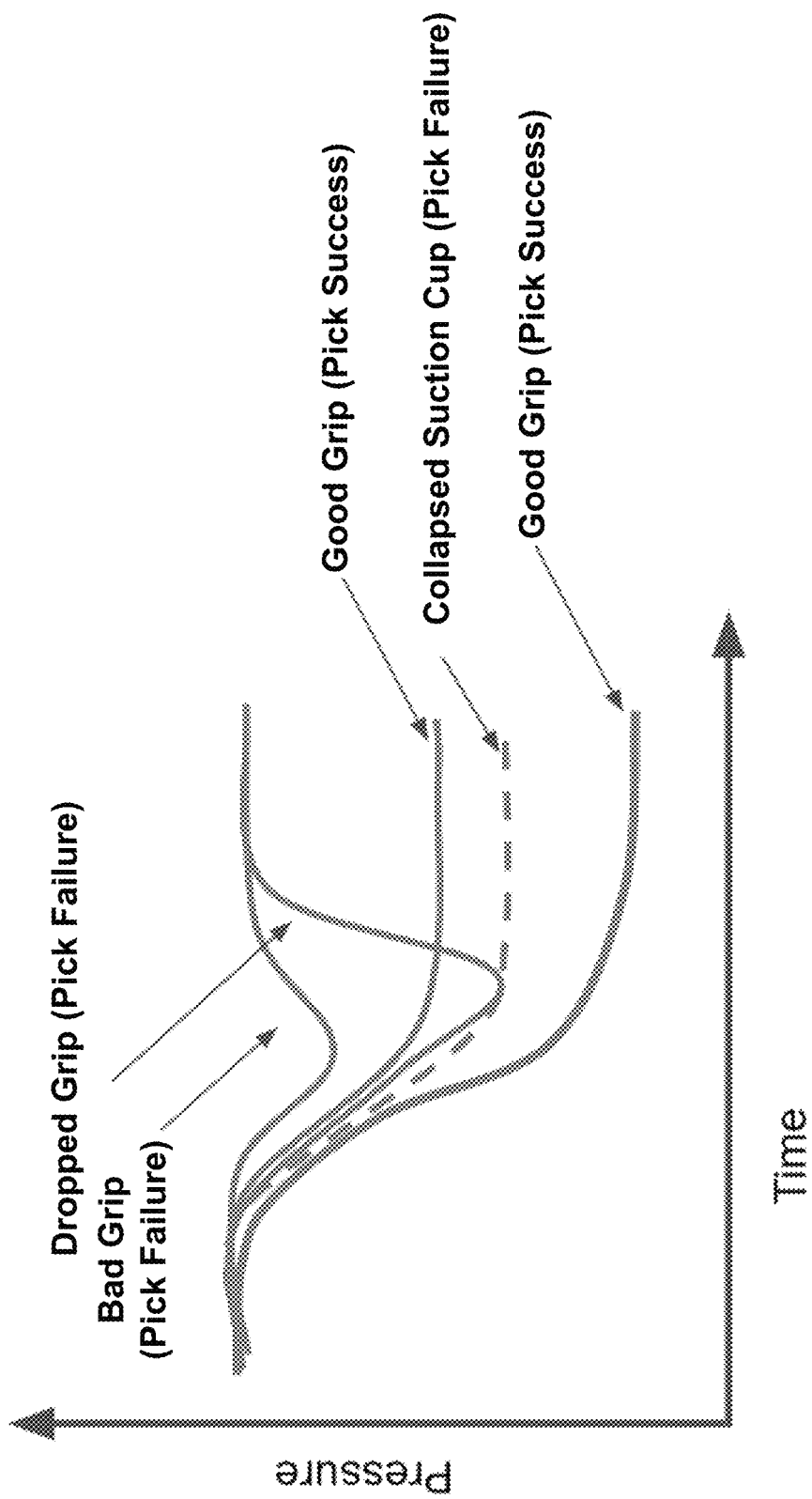
FIG. 6 is a diagram showing various example representative pressure sequences corresponding to different pick quality types.

FIG. 6 is a diagram showing various example representative pressure sequences corresponding to different pick quality types. While a pressure sequence may comprise a series of discrete pressure readings/measurements over time, the example pressure sequences that are shown in the graph are shown as continuous lines that are derived from a series of discrete readings/measurements. Common sources of error for the vacuum-based diverting mechanism include partial grips or collapsed suction cups, as either of these can produce signals similar to those generated from a good grip, making it difficult to have confidence in the recorded pressure sequences. FIG. 6 provides a diagram that shows the varying impact of grips (pick quality types) on an object by the vacuum-assisted diverting mechanism, and thus example types of information that can be gleaned from the pressure meter in the system via pressure sequences. The plot in FIG. 6 shows two pressure sequence curves that have been determined as representatives of good grip pick quality, which are associated with pick successes. There is a pressure differential between the two good grip pressure sequences based upon the amount of vacuum (negative pressure) in the pick operation (e.g., a very solid grip results in a higher vacuum and lower pressure). The higher of the two good grip pressure sequence curves in fact represents a grip on a lighter object with a successful pick operation (capture), but with less effective sealing of the suction at the gripper, and thus a higher pressure. The topmost bad grip pressure sequence curve is representative of a bad grip: pressure drops slightly then restores, representing a lack of seal and thus grip. The lower solid dropped grip pressure sequence curve represents an initial good grip on a target object but then the object is dropped; the pressure drops as the object is gripped, but then shoots back up as the object dislodges from the suction gripper mechanism. The dashed collapsed suction cup curve appears to be a good grip, but is in fact the result of a suction cup that has collapsed in the grip attempt.

In some embodiments, the representative pressure sequences corresponding to the different pick quality types that are shown in FIG. 6 could have been determined using a process such as process 500 of FIG. 5.

Figure 7:
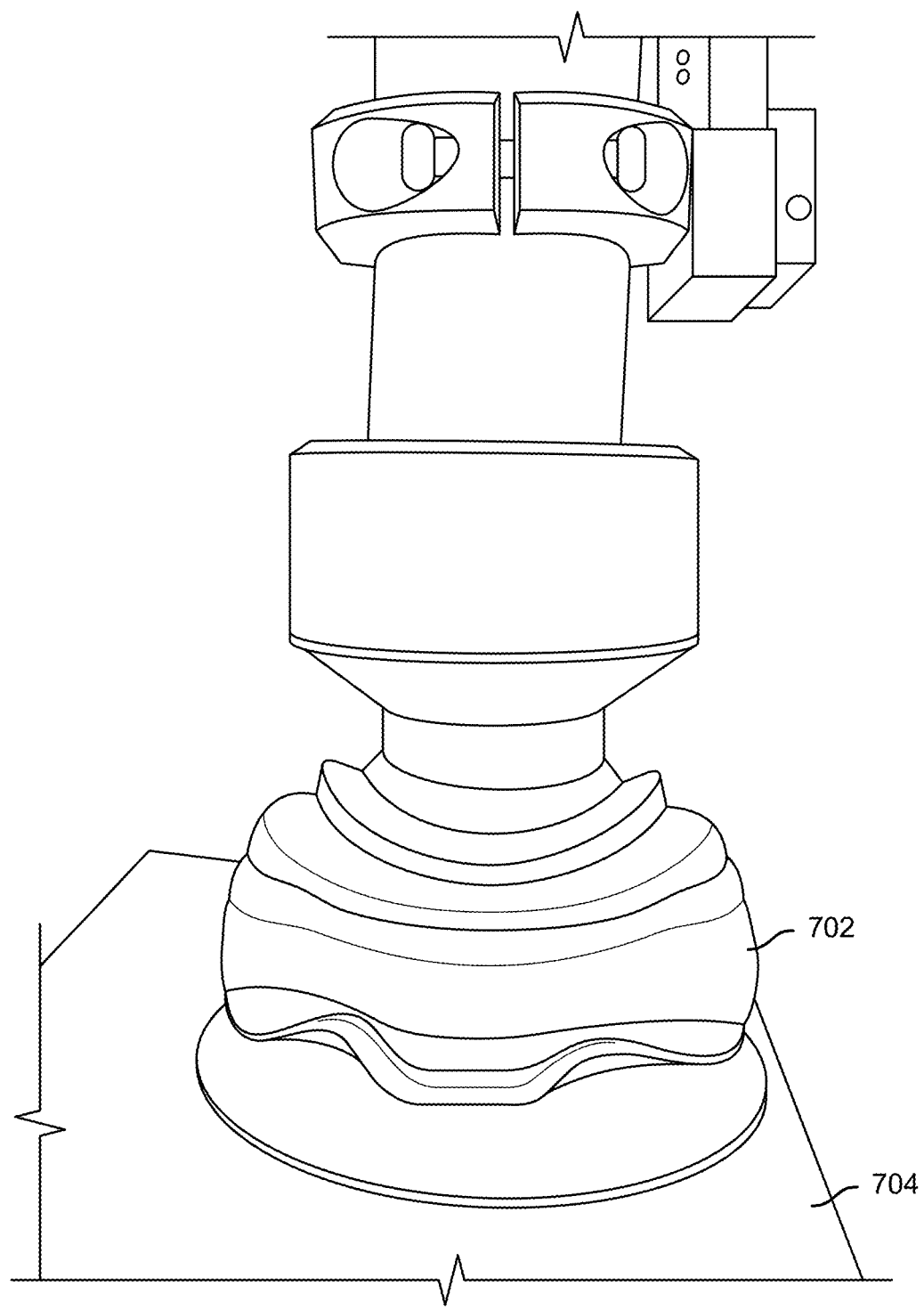
FIG. 7 is a diagram showing an example good grip pick quality type by a vacuum-based suction gripper mechanism with a suction cup attachment.

FIG. 7 is a diagram showing an example good grip pick quality type by a vacuum-based suction gripper mechanism with a suction cup attachment. As shown in FIG. 7, the lip of suction cup 702 is flush against surface 704 of a target object during a pick operation and therefore, suction cup 702 of the suction gripper mechanism is successfully gripping the target object. Such a successful grip/seal against surface 704 of the target object will very likely result in a successful capture/pick operation of the target object.

Figure 8:
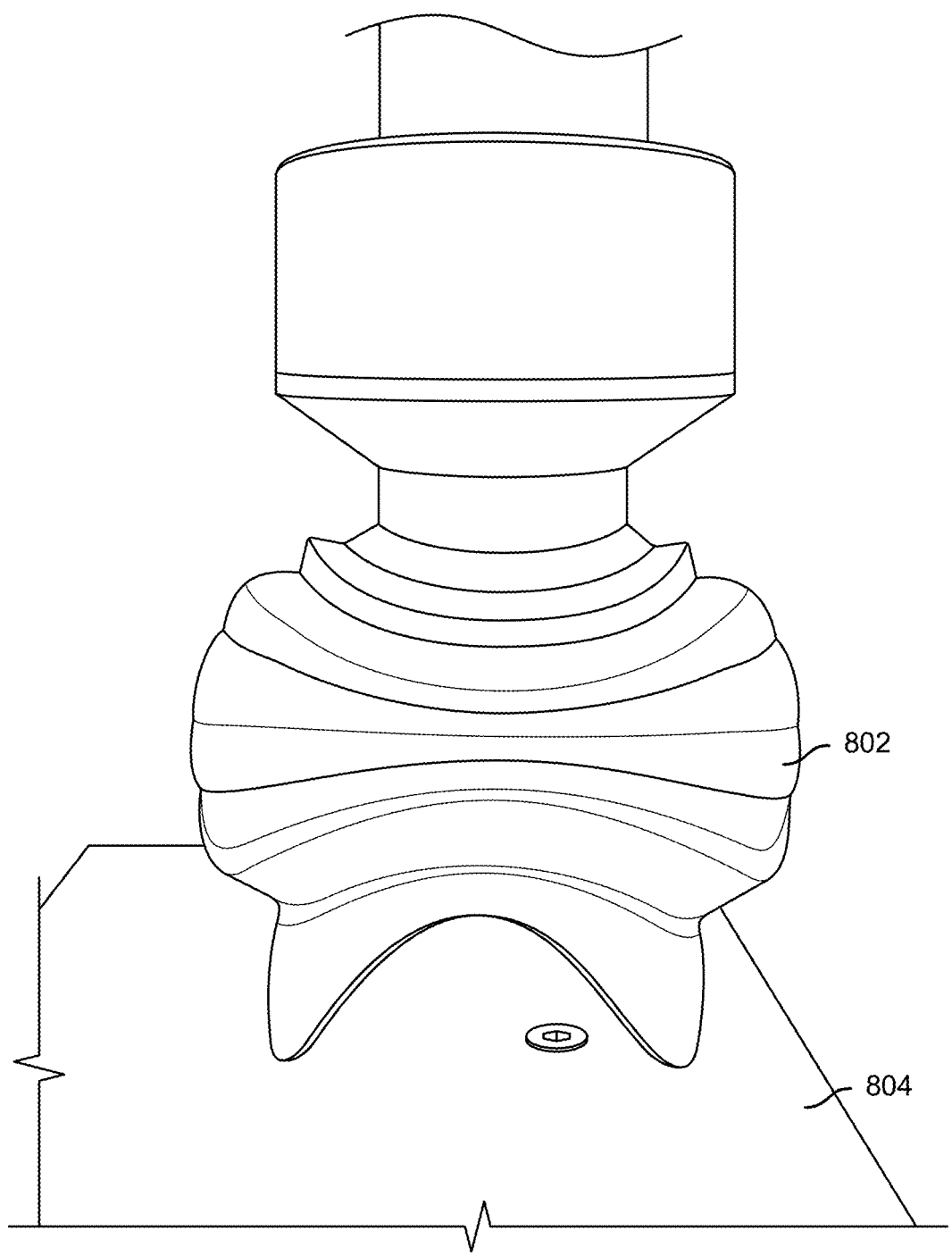
FIG. 8 is a diagram showing an example bad grip pick quality type by a vacuum-based suction gripper mechanism with a suction cup attachment.

FIG. 8 is a diagram showing an example bad grip pick quality type by a vacuum-based suction gripper mechanism with a suction cup attachment. As shown in FIG. 8, suction cup 802 has collapsed, which prevents suction cup 802 from establishing a successful grip/seal against surface 804 of the target object. Due to the collapsed nature of suction cup 802, the pick operation by the suction gripper mechanism on the target object will fail and not result in a successful capture/pick operation of the target object.

Figure 9:
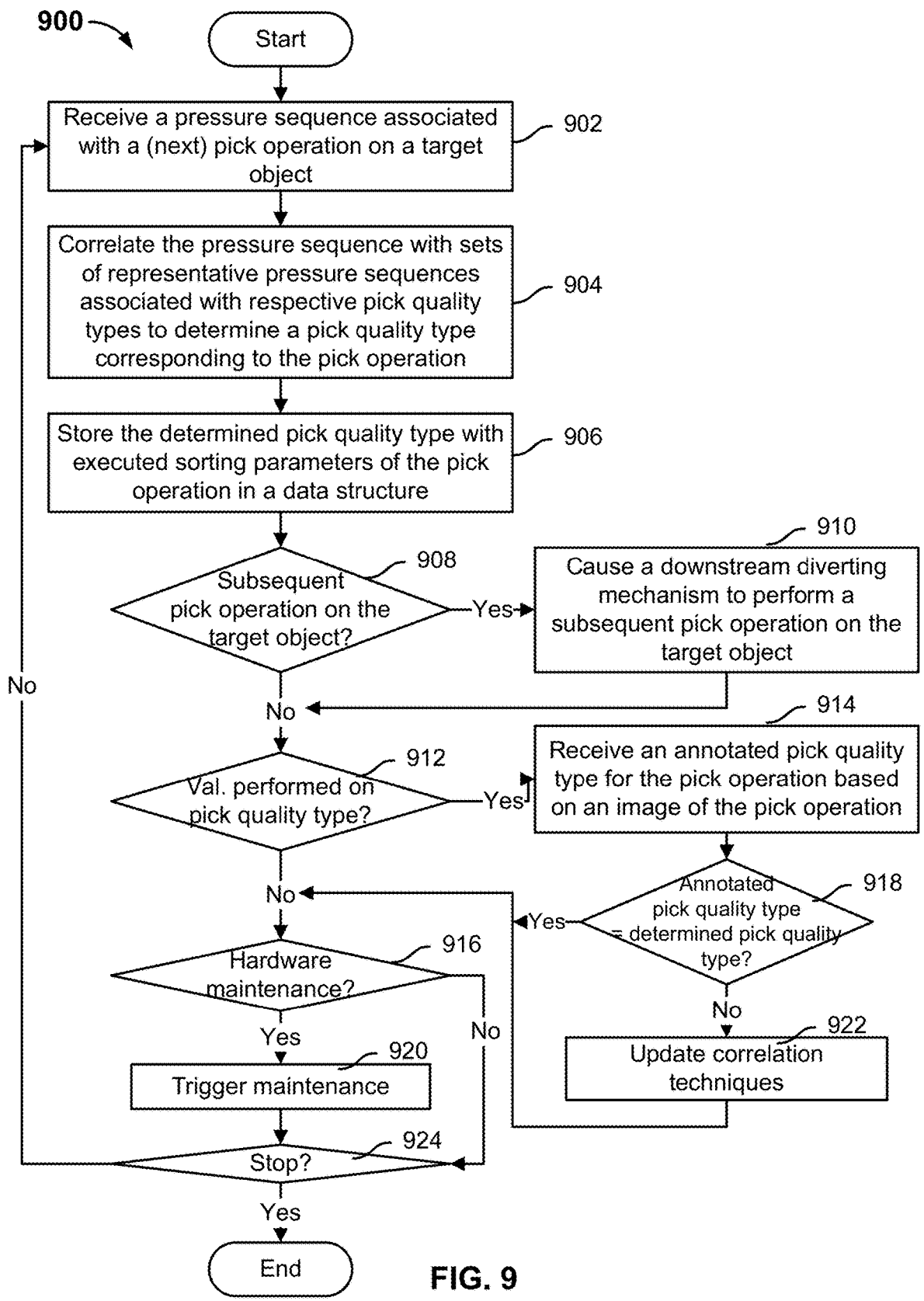
FIG. 9 is a flow diagram showing an example process for evaluating the pick quality type of a pick operation on a target object by a vacuum-assisted diverting mechanism at runtime in accordance with some embodiments.

FIG. 9 is a flow diagram showing an example process for evaluating the pick quality type of a pick operation on a target object by a vacuum-assisted diverting mechanism at runtime in accordance with some embodiments. In some embodiments, process 900 may be implemented at sorting system 100 of FIG. 1. Specifically, process 900 may be implemented, at least in part, by sorting control device 112 of sorting system 100 of FIG. 1.

Process 900 describes an example process in which a pick operation is evaluated for a pick quality type during runtime via its corresponding pressure sequence. Process 900 also describes determining if a pattern of unsuccessful grips emerges and taking actions that would improve the grip success for that diverting mechanism.

At 902, a pressure sequence associated with a (next) pick operation on a target object is received. The pressure sequence that is output by a pressure meter for the vacuum airflow through a vacuum-assisted diverting mechanism (e.g., a suction gripper mechanism) during its performance of a pick operation on a target object is received. A strong vacuum reading may be present in a case where the object normally does not register a high vacuum. A pressure build-up could also be present while reversing air flow to drop an object.

At 904, the pressure sequence is correlated with sets of representative pressure sequences associated with respective pick quality types to determine a pick quality type corresponding to the pick operation. The pressure sequence is correlated with the representative pressure sequences that have been determined for one or more respective pick quality types to determine a representative pressure sequence that the pressure sequence most closely matches. In a first example type of correlation, a correlation value is determined between the pressure sequence and each representative pressure sequence as a function of their Pearson correlation coefficient and optionally, heuristics (e.g., as determined from the shape of the pressure sequence). The pressure sequence is then assigned the pick quality type whose representative pressure sequence has the greatest correlation value with the pressure sequence being evaluated. In a second example type of correlation, a machine learning model has been trained on representative pressure sequences associated with one or more respective pick quality types such that the model can predict a pick quality type for an input pressure sequence. As mentioned above, each pick quality type also corresponds to either a pick operation success ("pick success") or pick operation failure ("pick failure").

At 906, the determined pick quality type is stored with executed sorting parameters of the pick operation in a data structure. In various embodiments, data corresponding to each instance of a pick operation is stored in a corresponding data structure. For example, the stored data corresponding to each instance of a pick operation includes one or more of the following: the determined pick quality, whether the pick operation was successful or a failure, the executed sorting parameters (e.g., the pick location, the robot speed, the robot acceleration, the robot hover height), the object type of the target object, and/or an image of the target object.

At 908, whether a subsequent pick operation is to be performed on the target object is determined. In the event that a subsequent pick operation is to be performed on the target object, control is transferred to 910. Otherwise, in the event that a subsequent pick operation is not to be performed on the target object, control is transferred to 912. In some embodiments, a subsequent pick operation is to be performed on the target object in the event that a set of subsequent pick operation criteria is met. An example criterion is whether the previous pick operation on the target object had failed as determined based on the pressure sequence of the pick operation. In the event that the set of subsequent pick operation criteria is met, instructions are to be sent to another diverting mechanism (e.g., one that is located downstream along the transport of objects through the sorting facility) to cause that diverting mechanism to perform a subsequent pick operation on the target object that was missed by the previous pick operation that was determined to have failed.

At 910, a downstream diverting mechanism is caused to perform the subsequent pick operation on the target object. In a first example, the downstream diverting mechanism can be instructed to prioritize the subsequent pick operation on the target object (e.g., over performing the pick operation on a different target object) because the previous pick operation had failed. In a second example, the downstream diverting mechanism can be instructed to perform the subsequent pick operation on the target object using a different set of sorting parameters than those that were used to perform the previous pick operation that had failed.

At 912, whether validation is to be performed on the determined pick quality type is determined. In the event that validation is to be performed on the determined pick quality type, control is transferred to 914. Otherwise, in the event that validation is not to be performed on the determined pick quality type, control is transferred to 916. In some embodiments, the programmatic evaluation of the pick quality type of a pick operation based on its recorded pressure sequence is (e.g., at given intervals and/or for a validation period) validated against other collected data associated with the pick operation.

At 914, an annotated pick quality type for the pick operation based on an image of the pick operation is received. In one example, the video frames of the pick operation that were captured by a quality control camera is annotated by either a human annotator that manually determines a pick quality type or a machine learning model that is trained to predict a pick quality type. Then, the annotated pick quality type as determined using the video frames showing the pick operation can be used to validate the pick quality type of the pick operation that was determined based on the recorded pressure sequence.

At 918, whether the annotated pick quality type matches the determined pick quality type is determined. In the event that the annotated pick quality type is consistent with the determined pick quality type, control is transferred to 916. Otherwise, in the event that the annotated pick quality type is not consistent with the determined pick quality type, control is transferred to 922.

At 922, correlation techniques are updated. In the event that the pick quality type of the pick operation that was determined based on the recorded pressure sequence cannot be validated (e.g., does not match the annotated pick quality type), then the correlation techniques that were used at step 904 can be updated. For example, if a machine learning model was used at step 904 to predict the pick quality type based on the input pressure sequence of the pick operation, then the model can be retrained.

At 916, whether hardware maintenance is to be triggered is determined. In the event that hardware maintenance is to be triggered, control is transferred to 920. Otherwise, in the event that hardware maintenance is not to be triggered, control is transferred to 924. In some embodiments, if a set of maintenance criteria is met, then hardware maintenance is to be triggered. In various embodiments, the set of maintenance criteria dictates if a predetermined count or proportion of recent pick operations have failed, then hardware in the sorting system can be maintained to improve future pick operations. In general, the set of maintenance criteria is configured to identify sub-optimal performance (e.g., frequent drops or missed grabs) by the vacuum-based diverting mechanism.

The monitoring comprises visual or pressure gradient tracking using one or more pressure meters in the vacuum system. Information from the pressure or flow sensor can be used to identify if frequent bad grips are occurring. As will be described further below, system response curves are analyzed with respect to a normal base state, and variations are used to infer changes in the state of the vacuum-based gripper mechanism that actuates attached to the vacuum line. In some cases, certain variations indicate a problem in the system, which may trigger maintenance to modify the behavior of one or more diverting mechanisms. In some embodiments, the maintenance may include one or more of the following: a notification sent to an operator that the robot/vacuum-based gripper mechanism needs to be inspected, automatic filter cleaning or suction cup changes, or even modifications to robot control signals to alter pick locations that are regularly missed. Components of the vacuum-based diverting mechanism that can be fixed through such detection include broken or worn suction cups (e.g., that are identified by a poor vacuum on objects that should be easily picked), broken air hoses (e.g., that are identified with lower than normal vacuum readings when picking), or broken air valves (e.g., that are indicated by improper airflow based on system baseline—e.g., air flowing while no pick is being made).

At 924, whether pick quality type evaluation of pick operation is to be continued is determined. In the event that pick quality type evaluation of pick operation is to be continued, control is returned to 902. Otherwise, in the event that pick quality type evaluation of pick operation is to be stopped, process 900 ends. For example, pick quality type evaluation of pick operations can stop if the sorting system is powered down or if the operation is suspended for maintenance.

Figure 10:
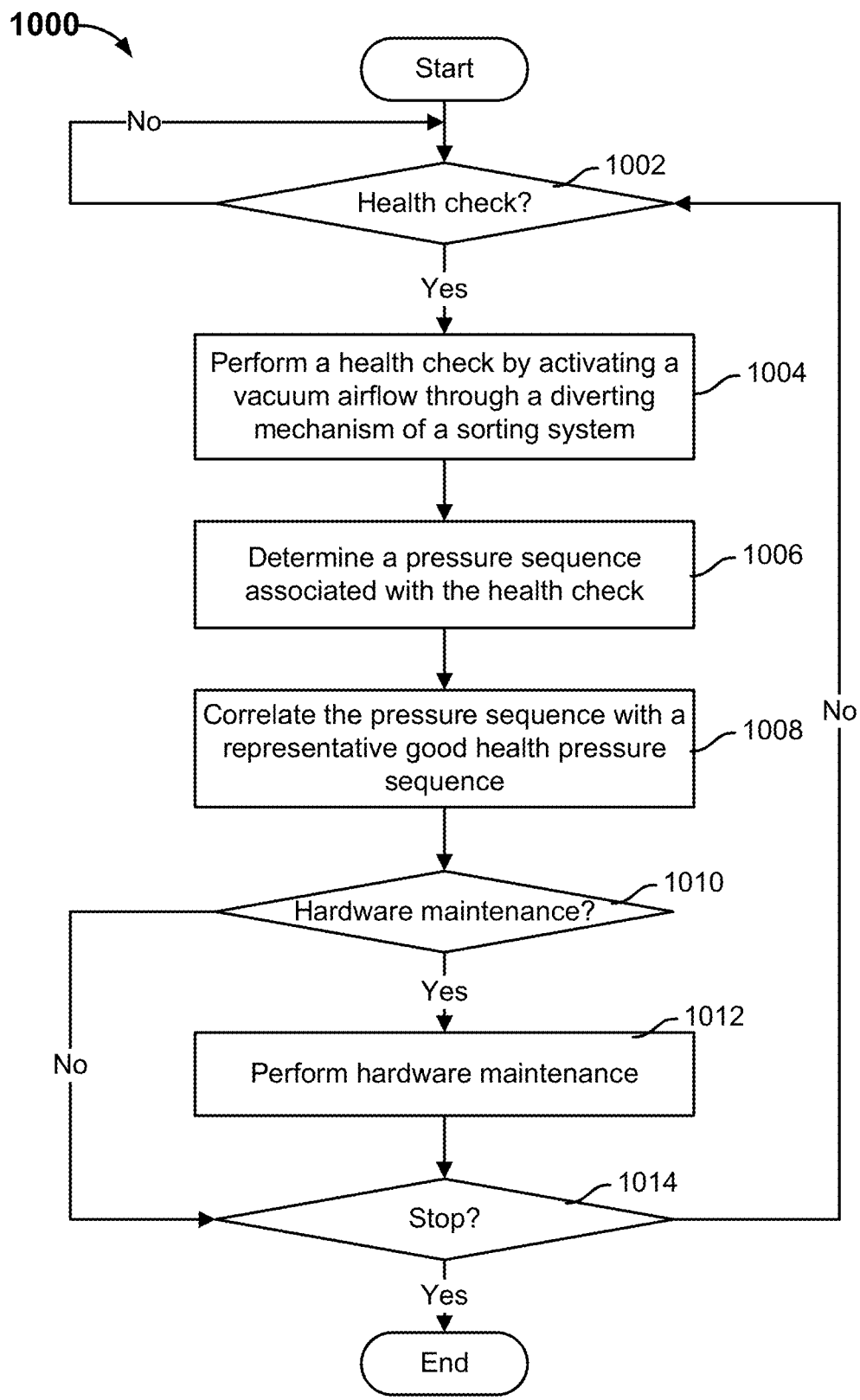
FIG. 10 is a flow diagram showing an example process for performing a health check on a vacuum-assisted diverting mechanism in accordance with some embodiments.

FIG. 10 is a flow diagram showing an example process for performing a health check on a vacuum-assisted diverting mechanism in accordance with some embodiments. In some embodiments, process 1000 may be implemented at sorting system 100 of FIG. 1. Specifically, process 1000 may be implemented, at least in part, by sorting control device 112 of sorting system 100 of FIG. 1.

Process 1000 describes a scenario in which the sorting system could detect problems in a diverting mechanism (e.g., a suction gripper mechanism) when the diverting mechanism is not performing a pick operation. By recording a health check pressure sequence of a vacuum airflow being pulled through a diverting mechanism when the diverting mechanism is not performing a pick operation, the health check pressure sequence can be evaluated to determine whether maintenance needs to be performed on the sorting system. Performing such a health check could detect when the vacuum system pressure appears correct during a pick operation but is actually misrepresented due to filter or air flow clogs. For example, a change in the rate that a vacuum is formed when no pick operation is being performed (i.e., when the diverting mechanism is not engaging an object) indicates the system is becoming clogged (e.g., from residue that is collected over previous pick operations).

At 1002, whether a health check is to be performed for a diverting mechanism is determined. In the event that a health check is to be performed for a diverting mechanism, control is transferred to 1004. Otherwise, in the event that a health check is not to be performed for a diverting mechanism, control is returned to 1002 after a waiting period. In a first example, a health check is performed on a diverting mechanism after every predetermined number of pick operations are performed. In a second example, a health check is performed on a diverting mechanism if the diverting mechanism is idle (e.g., has not been instructed to perform a pick operation for at least a predetermined length of time).

At 1004, a health check is performed by activating a vacuum airflow through the diverting mechanism of a sorting system without performing a pick operation. The vacuum airflow is pulled through the diverting mechanism without the diverting mechanism positioning a gripper mechanism (e.g., a suction cup) over/on a target object. For example, in a health check, the vacuum airflow is pulled through the diverting mechanism when it is in a resting position (e.g., a default position that it goes to in between performing pick operations).

At 1006, a pressure sequence associated with the health check is determined. The faster the expected pressure is reached, the "cleaner" the sorting system.

At 1008, the pressure sequence is correlated with a representative good health pressure sequence. The recorded pressure sequence associated with the health check is compared against a previously determined representative good health pressure sequence (e.g., a pressure sequence that is recorded during a health check calibration period in which all components of the vacuum-based sorting system were known to be in a good/healthy/clean condition). For example, a Pearson correlation coefficient can be computed between the recorded pressure sequence associated with the health check and the previously determined representative good health pressure sequence.

At 1010, whether hardware maintenance is to be performed is determined based on the correlation. If the recorded pressure sequence associated with the health check is strongly correlated (e.g., the correlation value is greater than a threshold) with the previously determined representative good health pressure sequence, then it is determined that the sorting system is in a healthy condition and maintenance does not need to be performed. Otherwise, if the recorded pressure sequence associated with the health check is not strongly correlated (e.g., the correlation value is not greater than a threshold) with the previously determined representative good health pressure sequence, then it is determined that the sorting system is not in a healthy condition and maintenance does need to be performed.

At 1012, hardware maintenance is performed. A typical diagnostic/repair step would be to change the air filter and clean out the gripper shaft—both of which could be accomplished independently by the robot/vacuum-based suction gripper mechanism itself, in some embodiments. A self-cleaning routine could change the filter and gripper cup. This would be similar to a computerized numerical control (CNC) tool changer switching tooling when a new tool is needed. Instead of changing a tool, the system would change the cup. For example, in response to a detection of a clogged state, the vacuum-based suction gripper mechanism can self-clean by cleaning the suction cup, the debris filter, and/or the shaft. If this does not improve the situation, the system could alert the facility operator that an air hose is clogged.

At 1014, whether performing health checks on the diverting mechanism is to be stopped is determined. In the event that performing health checks on the diverting mechanism is not to be stopped, control is returned to step 1002. Otherwise, in the event that performing health checks on the diverting mechanism are to be stopped, process 1000 ends.

In various embodiments described herein, the location on an exposed surface of a target object with which a diverting mechanism (e.g., a suction gripper mechanism) engages (e.g., applies contact/suction) is sometimes referred to as a "pick location" (or "grip location"). The "pick location" is a sorting parameter that can be selected (e.g., by a sorting control device such as sorting control device 112 of FIG. 1) for each particular pick operation of a target object. In some embodiments, the selected pick location on a target object comprises an ideal location (e.g., of a surface of the object) on which to apply vacuum force (e.g., via a suction gripper mechanism) to grip the object. In some embodiments, a sorting system (e.g., such as sorting system 100 of FIG. 1) utilizes a combination of pressure measurements and vision recognition to optimize capture behavior. One method to combat bad pick/grip success is to create a better understanding of the material's topology. Since objects may have regions with creases, holes, or folds where it is very difficult to successfully grip with a vacuum system, the sorting system can be configured to accurately identify suitable target areas/locations on objects.

Figure 11:
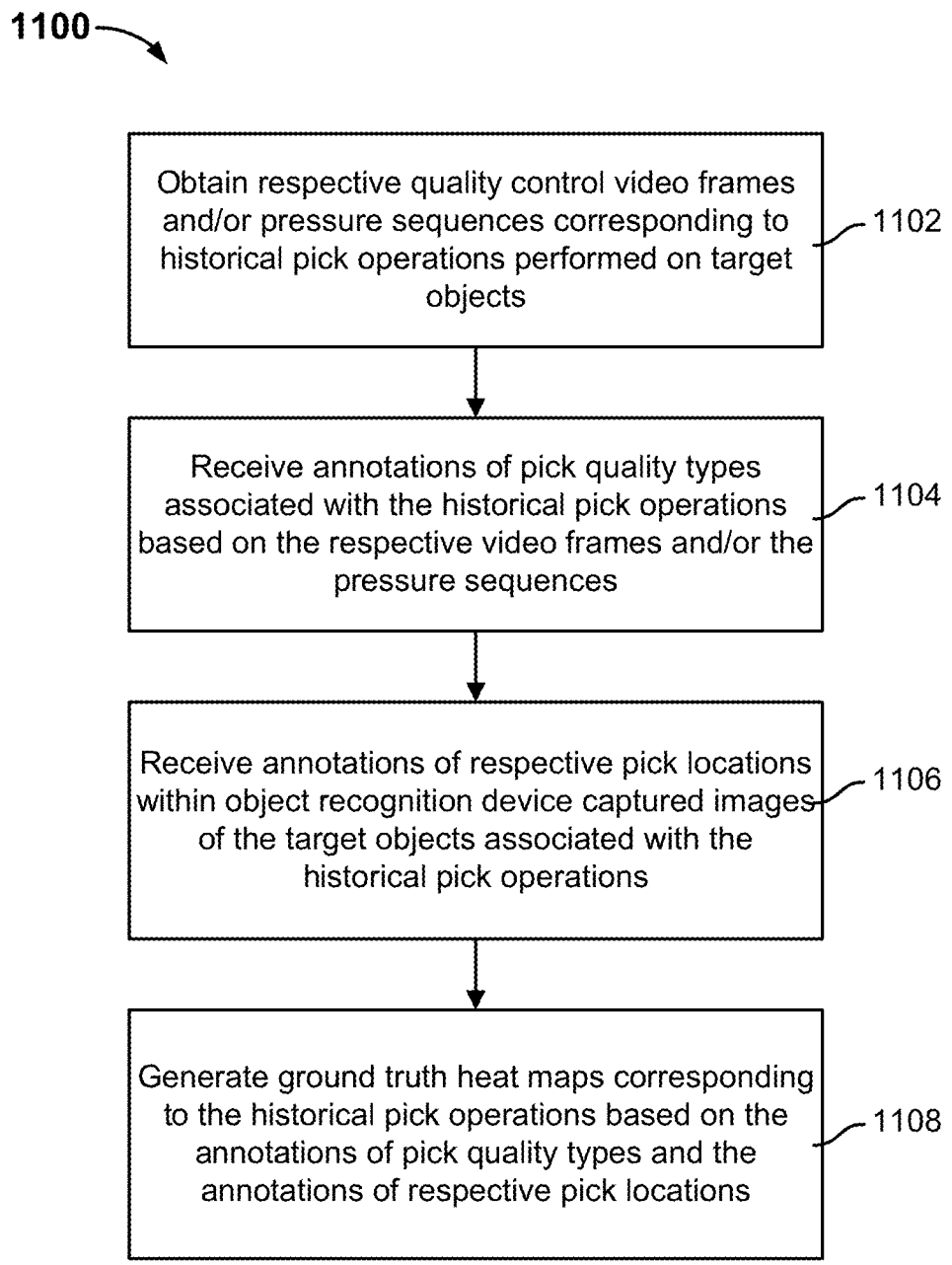
FIG. 11 is a flow diagram showing an example process for generating ground truth heat maps associated with historical pick locations in accordance with some embodiments.

FIG. 11 is a flow diagram showing an example process for generating ground truth heat maps associated with historical pick locations in accordance with some embodiments. In some embodiments, process 1100 may be implemented at sorting system 100 of FIG. 1. Specifically, process 1100 may be implemented, at least in part, by sorting control device 112 of sorting system 100 of FIG. 1.

Process 1100 describes an example process by which ground truth heat maps that are (e.g., overhead) images of target objects that were involved in historical pick operations are labeled with the respective pick locations of the historical pick operations and also labeled with whether the historical pick operations were successful. For example, process 1100 may be performed during a pick probability calibration period. As will be further described in detail below, such ground truth heat maps will be used as training data to train a machine learning component to predict pick location probability heat maps for an input image of a target object.

At 1102, respective quality control video frames and/or pressure sequences corresponding to historical pick operations performed on target objects are obtained. Recorded data from completed/historical pick operations by one or more diverting mechanisms are obtained. The recorded data may include the pressure sequences that were recorded by a pressure meter during the pick operation performed by vacuum-assisted diverting mechanisms (e.g., robot actuated suction gripper mechanisms). The recorded data may also include video frames from a quality control camera (e.g., quality control camera 120 of FIG. 1) that captured the historical pick operations as they were performed by the vacuum-assisted diverting mechanisms.

At 1104, annotations of pick quality types associated with the historical pick operations based on the respective video frames and/or the pressure sequences are received. The pick quality types (e.g., good grip, bad grip, dropped grip, collapsed suction cup) and their corresponding pick successes or failures of the historical pick operations can be determined based on either or both of the quality control video frames or the pressure sequences. In a first example, the pressure sequences of the historical pick operations can be programmatically correlated with representative pressure sequences (e.g., using a process such as process 900 of FIG. 9) associated with different pick quality types to assign a pick quality type and also pick success/failure with each historical pick operation. In a second example, the quality control video frames showing the historical pick operations can be either manually evaluated by an annotator or analyzed by a machine learning model to assign/predict a pick quality type and also pick success/failure associated with each historical pick operation.

At 1106, annotations of respective pick locations within object recognition device captured images of the target objects associated with the historical pick operations are received. In a first example, the pick location on a target object that was selected for each historical pick operation can be identified as a predetermined location on the target object. Specifically, the predetermined location on the target object can be the centroid of any type of object or be specifically associated with each object type. In a second example, the pick location on a target object that was selected for each historical pick operation can be manually identified by an annotator from reviewing the quality control video frames of the historical pick operation in action or by analyzing by a machine learning model to assign/predict the selected pick location associated with each historical pick operation. The pick location of each target object that was involved in a historical pick location is annotated within a (e.g., overhead) cropped image of the target object. For example, the cropped image of the target object was cropped from the overhead image taken by the object recognition device (e.g., object recognition device 110 of FIG. 1) of potentially multiple objects.

The following is a specific example of annotating a pick location: a geometrical representation of the object being picked is annotated with data indicative of the physical region where the operation was attempted (e.g., on the handle of a cup). The annotations are manually performed as part of training. For example, for each pick attempt, the location and success/failure of that attempt is manually annotated and associated with the image. In a specific example, the computer vision camera's view of the conveyor belt, the pixel coordinates of where an object viewable was picked in that view, and quality control camera footage of the diverting mechanism (e.g., a suction gripper mechanism that is actuated by a robot) during the pick are uploaded to a cloud server. An annotator then reviews the quality control footage to see if the diverting mechanism picks the object successfully or not. Since the source quality control image and the pixel coordinates of where the object was attempted are available as reference, the annotator can annotate the small region on the targeted object surrounding the pick location as either a successful spot or a failing spot.

At 1108, ground truth heat maps corresponding to the historical pick operations are generated based on the annotations of pick quality types and the annotations of respective pick locations. In some embodiments, each ground truth heat map is a (e.g., overhead) cropped image of the target object that is annotated with both the pick location and also pick quality type/pick success or failure of the relevant historical pick location. For example, each ground truth heat map is a (e.g., overhead) cropped image of the target object that is annotated with a value at the region (e.g., as denoted by a circle, polygon, or another shape) of the pick location on the target object and where the value indicates a "1" if the historical pick operation was successful and a "0" if the historical pick operation was not successful.

Figure 12:
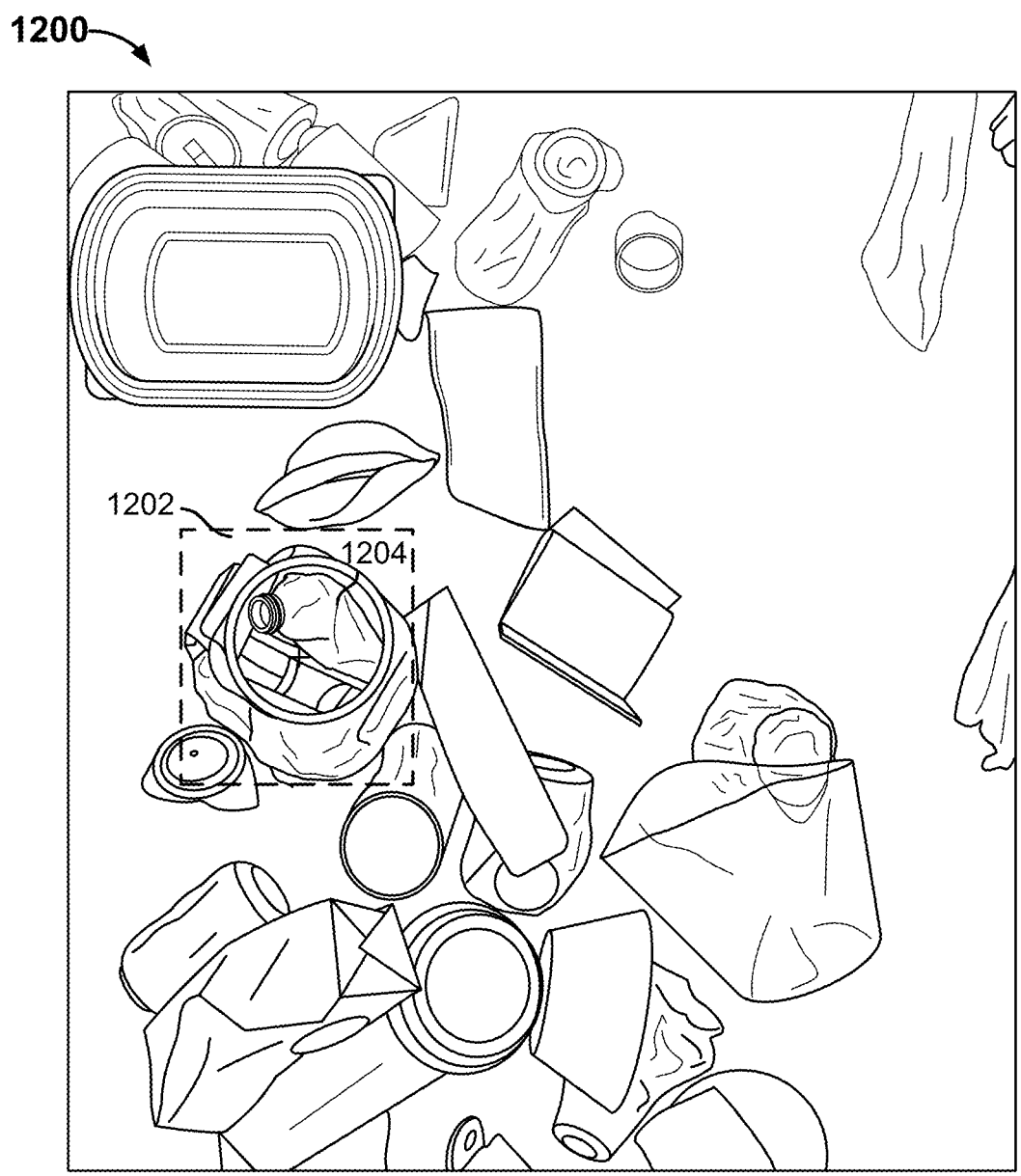
FIG. 12 is a diagram showing an example image of objects that are captured by an object recognition device in accordance with some embodiments.

FIG. 12 is a diagram showing an example image of objects that are captured by an object recognition device in accordance with some embodiments. In some embodiments, image 1200 is captured by an object recognition device that is located above and pointing down towards the surface of a conveyor device such as, for example, object recognition device 110 of FIG. 1. As such, image 1200 is an overhead image of multiple objects that are being conveyed in a sorting facility and upstream from a diverting mechanism. While not shown in FIG. 12, at runtime, an overhead image of objects on a conveyor device such as image 1200 can be fed into a (core) machine learning model that has been trained to detect the location of (e.g., bounding boxes around) objects within an image, determine the object types (e.g., material types, the product types) of objects within the detected objects, and/or determine which of the detected objects match a set of target object criteria and are therefore target objects on which a diverting mechanism, which is located downstream from the location of the object recognition device, is to perform pick operations. Also, cropped images including target objects can be determined from overhead image 1200 and after pick operations are attempted on such target objects, the cropped images of target objects can be annotated with the pick locations used in the pick operations and also annotated with whether the pick operations were successful or not. For example, bounding box 1202 around a detected object (e.g., a tub) can be used to generate a cropped image of the enclosed target object. As mentioned above, images of target objects on which pick operations were performed and that are annotated with the pick locations and the pick operation results (e.g., success or failure) are sometimes referred to as geometric or ground truth heat maps. In various embodiments, the core machine learning model is trained to identify object surface characteristics that would be consistent with patterns (e.g., creases, ridges, or holes in materials) that contribute to poor pick quality types (pick quality types that result in pick failures). Such surface characteristics would disqualify areas on an object with those features as target areas/locations on which to apply vacuum force. The machine learning model can be trained to recognize such pick location areas using ground truth heat maps, as described herein, for example. Ground truth heat maps may be 2D, 3D, or a combination of both and may be used to create a model to use for identifying the best locations on objects to pick and the locations with which to avoid engaging.

Figure 13:
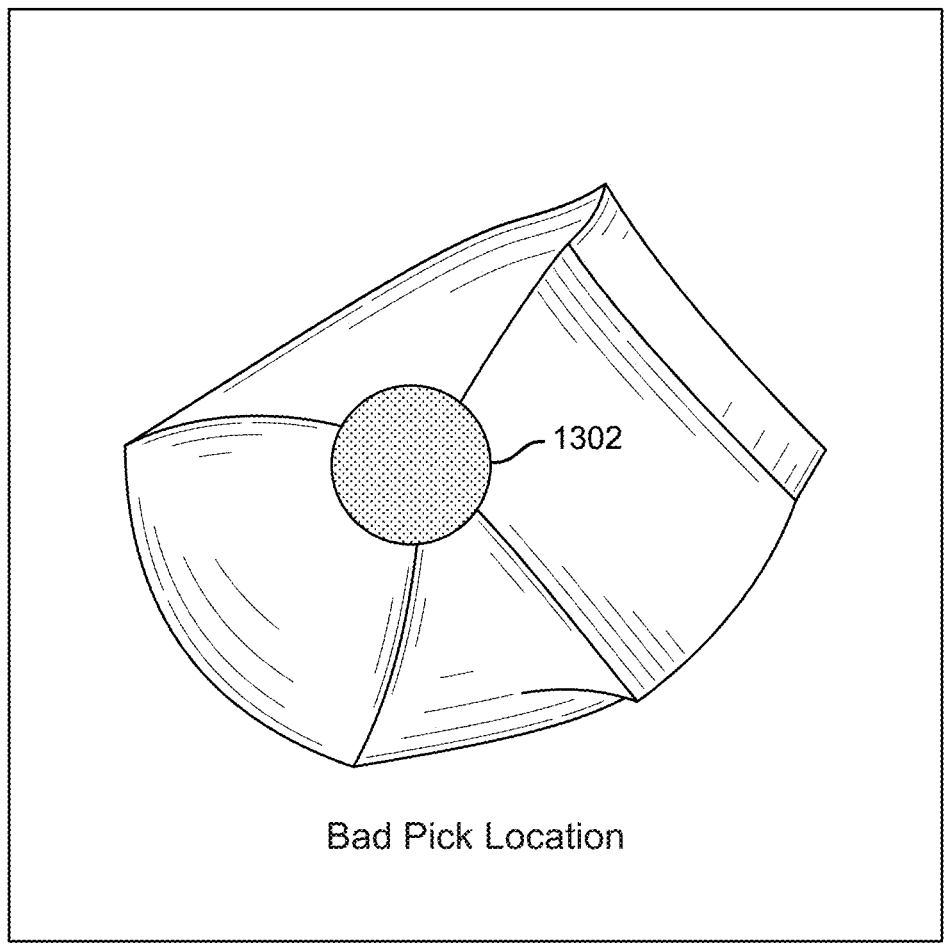
FIG. 13 is a diagram that shows a pick location that is associated with a lower probability of pick success.
Figure 14:
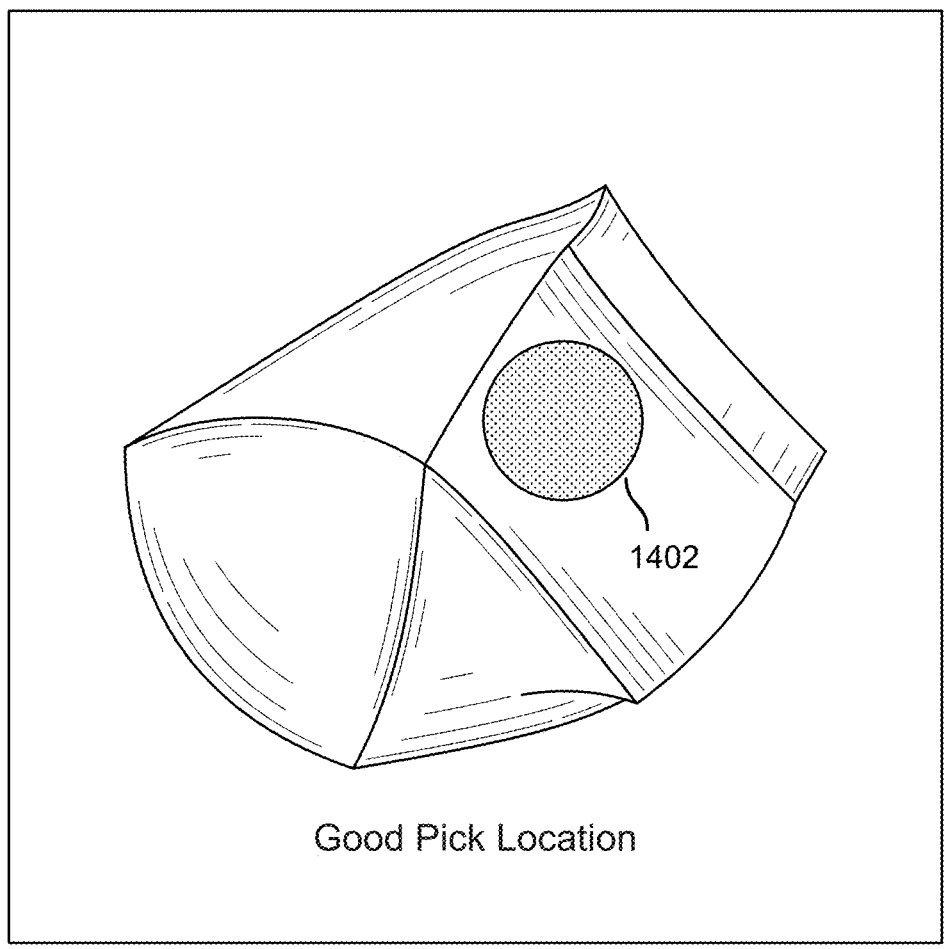
FIG. 14 is a diagram that shows a pick location that is associated with a higher probability of pick success.

Pick locations on a surface of an object that may be better (more likely to result in a successful pick operation) or worse (less likely to result in a successful pick operation) are determined as a function of the features on those areas of the object. FIG. 13 is a diagram that shows a pick location that is associated with a lower probability of pick success. Pick location 1302 is associated with a lower probability of pick success because pick location 1302 is located on a ridge/convex point of the object. When a vacuum-assisted diverting mechanism (e.g., a suction gripper mechanism) engages/contacts the object at pick location 1302 during a pick operation, the ridge/convex point at that location will likely prevent the suction gripper mechanism from forming a tight seal (good grip) against the object and as such, the pick operation is likely to fail. In contrast, FIG. 14 is a diagram that shows a pick location that is associated with a higher probability of pick success. Pick location 1402 is associated with a higher probability of pick success because pick location 1402 is located on a flat and smooth area of the object. When a vacuum-assisted diverting mechanism (e.g., a suction gripper mechanism) engages/contacts the object at pick location 1402 during a pick operation, the suction gripper mechanism will likely form a tight seal (good grip) on the flat and smooth surface of the object and as such, the pick operation is likely to succeed.

Figure 15:
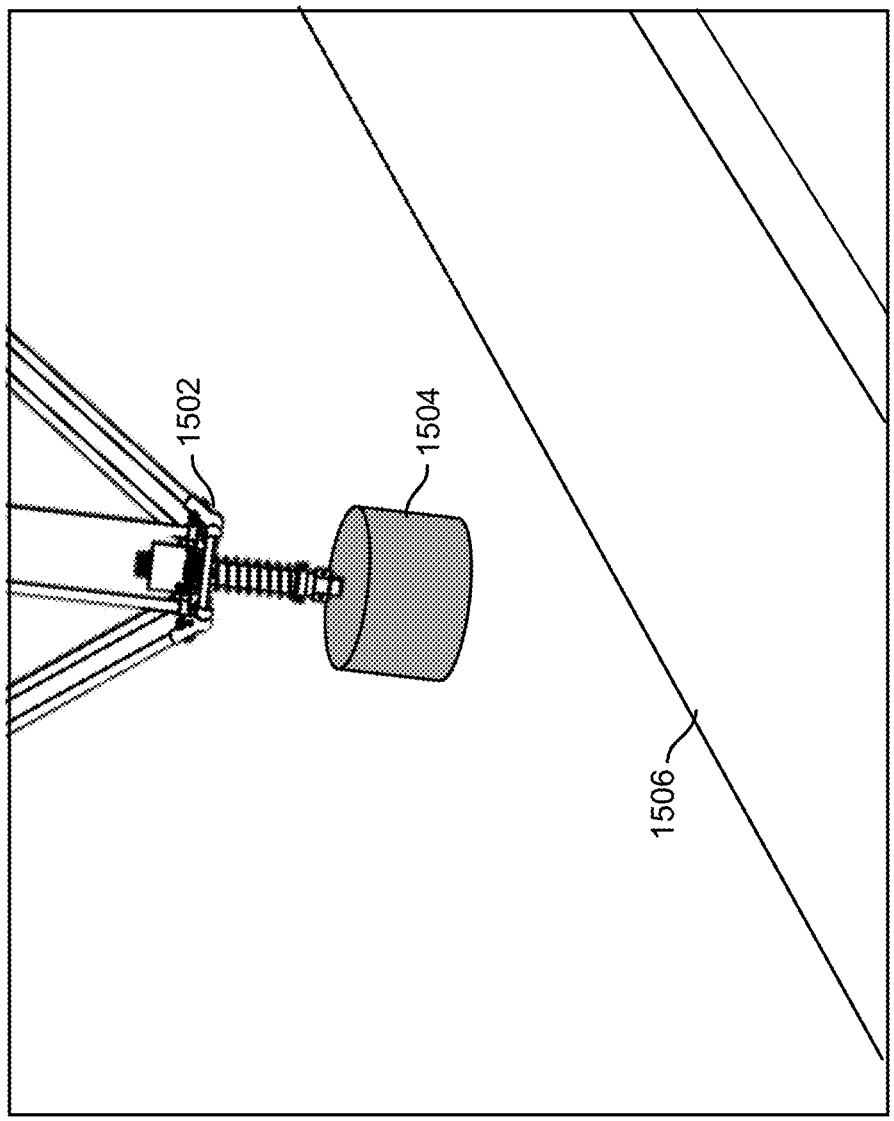
FIG. 15 is a diagram showing an example of an image (or video frame) that is captured of a vacuum-assisted diverting mechanism while the diverting mechanism is in the middle of performing a pick operation on a target object.

FIG. 15 is a diagram showing an example of an image (or video frame) that is captured of a vacuum-assisted diverting mechanism while the diverting mechanism is in the middle of performing a pick operation on a target object. Image (or video frame) 1500 shows that the diverting mechanism, suction gripper mechanism 1502, has successfully gripped target object 1504 off of conveyor device 1506. In some embodiments, image 1500 was captured by a quality control camera (e.g., quality control camera 120 of FIG. 1) during the ongoing pick operation. As described above, based on images (or video frames) such as image 1500 (e.g., that was captured by a quality control camera such as quality control camera 120 of FIG. 1) that show a pick operation of a target object, another image, the (e.g., cropped) overhead image (e.g., that was captured by an object recognition device such as object recognition device 110 prior to the pick operation) including that same target object can be annotated with whether the depicted pick operation was successful or not, and also annotated with the pick location that was utilized by the pick operation on the target object. As mentioned above, images such as image 1500 showing a pick operation can be manually reviewed by an annotator or analyzed by a machine learning model to determine whether the depicted pick operation on the relevant target object was successful or not. The pick location on the target object can then be determined based on a predetermined pick location associated with the determined object type of the target object, a predetermined pick location associated with any type of object, or a manually determined or machine learning model predicted pick location from images such as image 1500 showing a pick operation. The cropped overhead image (not shown in FIG. 15) of target object 1504 for which a corresponding pick location was shown in image 1500 can be identified and annotated with the respective determined pick success/failure and the determined pick location by correlating the object identifier (e.g., ID) that is given to target object 1504 (e.g., the object ID is assigned by the core machine learning model that had detected target object 1504). Such an annotated cropped overhead image of a target object is an example of a geometric "ground truth pick location heat map" or simply "ground truth heat map."

Figure 16:
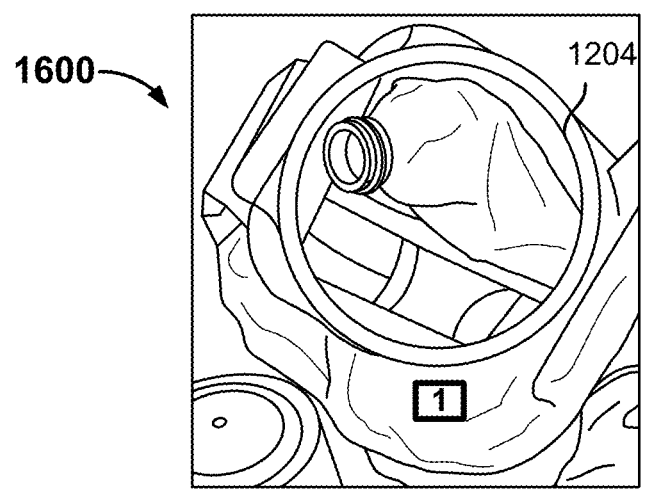
FIG. 16 is a diagram showing an example of a ground truth pick location heat map in accordance with some embodiments.

FIG. 16 is a diagram showing an example of a ground truth pick location heat map in accordance with some embodiments. In FIG. 16, ground truth heat map 1600 shows a cropped overhead image of tub 1204 that was shown within bounding box 1202 in overhead image 1200 of FIG. 12. During the monitoring phase, after a pick operation was attempted on tub 1204, the success or failure of the pick operation was determined (e.g., based on captured images/video frames of the pick operation or based on a recorded pressure sequence corresponding to that pick operation) and the pick location of the pick operation was also determined. In the example of FIG. 16, the attempted pick operation on tub 1204 was successful and as such, ground truth heat map 1600 shows a "1" (where the value of "1" indicates a successful pick operation) at the pick location of the pick operation. While not shown in the example of FIG. 16, in some other examples of a ground truth heat map, in the event that the pick operation failed, a "0" (or another value) can be annotated at the pick location on the cropped overhead image of the target object. Also, in another example, "NULL" can be annotated on a cropped overhead image of a target object for which no pick operation was performed.

Figure 17:
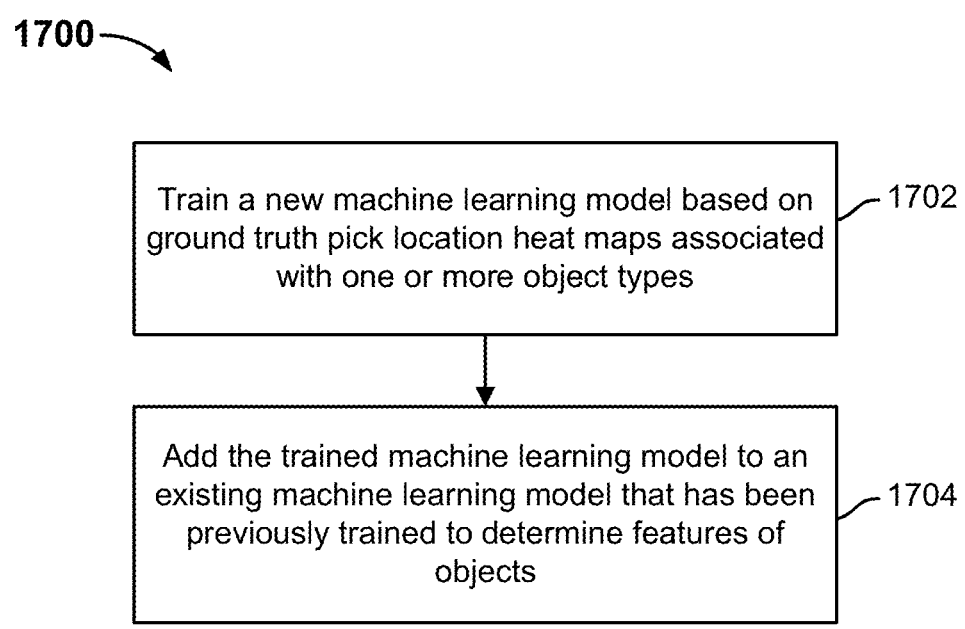
FIG. 17 is a flow diagram showing an example process of training a new machine learning model based on ground truth pick location heat maps in accordance with some embodiments.

FIG. 17 is a flow diagram showing an example process of training a new machine learning model based on ground truth pick location heat maps in accordance with some embodiments. In some embodiments, process 1700 may be implemented at sorting system 100 of FIG. 1. Specifically, process 1700 may be implemented, at least in part, by sorting control device 112 of sorting system 100 of FIG. 1.

At 1702, a new machine learning model is trained based on ground truth pick location heat maps associated with one or more object types. A new machine learning model (e.g., a neural network) is then trained using the ground truth pick location heat maps (such as the example shown in FIG. 16) corresponding to objects to learn locations/patterns/features of objects that are associated with pick success based on the historical locations of pick attempts on the objects.

At 1704, the trained machine learning model is added to an existing machine learning model that has been previously trained to determine features of objects. In some embodiments, a new neural model component (neural network head) is added to an existing neural network (a "core" neural model) that has been previously trained to recognize features such as, for example, the locations, bounding boxes, types, orientations, etc., of objects from input images that were captured by an object recognition device. This new neural network head is trained on the ground truth heat maps and is added as a new "head" to an existing, core neural network so that it only runs when an identified object is recognized by the core neural network. This neural network head that is trained on ground truth heat maps is sometimes referred to as the "pick location probability heat map head" and is configured to predict/output a pick location probability heat map to each of one or more target objects in response to an input of an (e.g., overhead) image of the target objects. For example, this input image of the target objects was captured by an object recognition device (e.g., object recognition device 110 of FIG. 1) at a sorting facility.

In some embodiments, a separate machine learning model (or neural network head) can be separately trained based on the ground truth heat maps that are associated with each distinct object type. For example, a first neural network head can be generated based on ground truth heat maps that are associated with Object Type 1 (e.g., plastic materials) and a second neural network head can be generated based on ground truth heat maps that are associated with Object Type 2 (e.g., paper materials).

Figure 18:
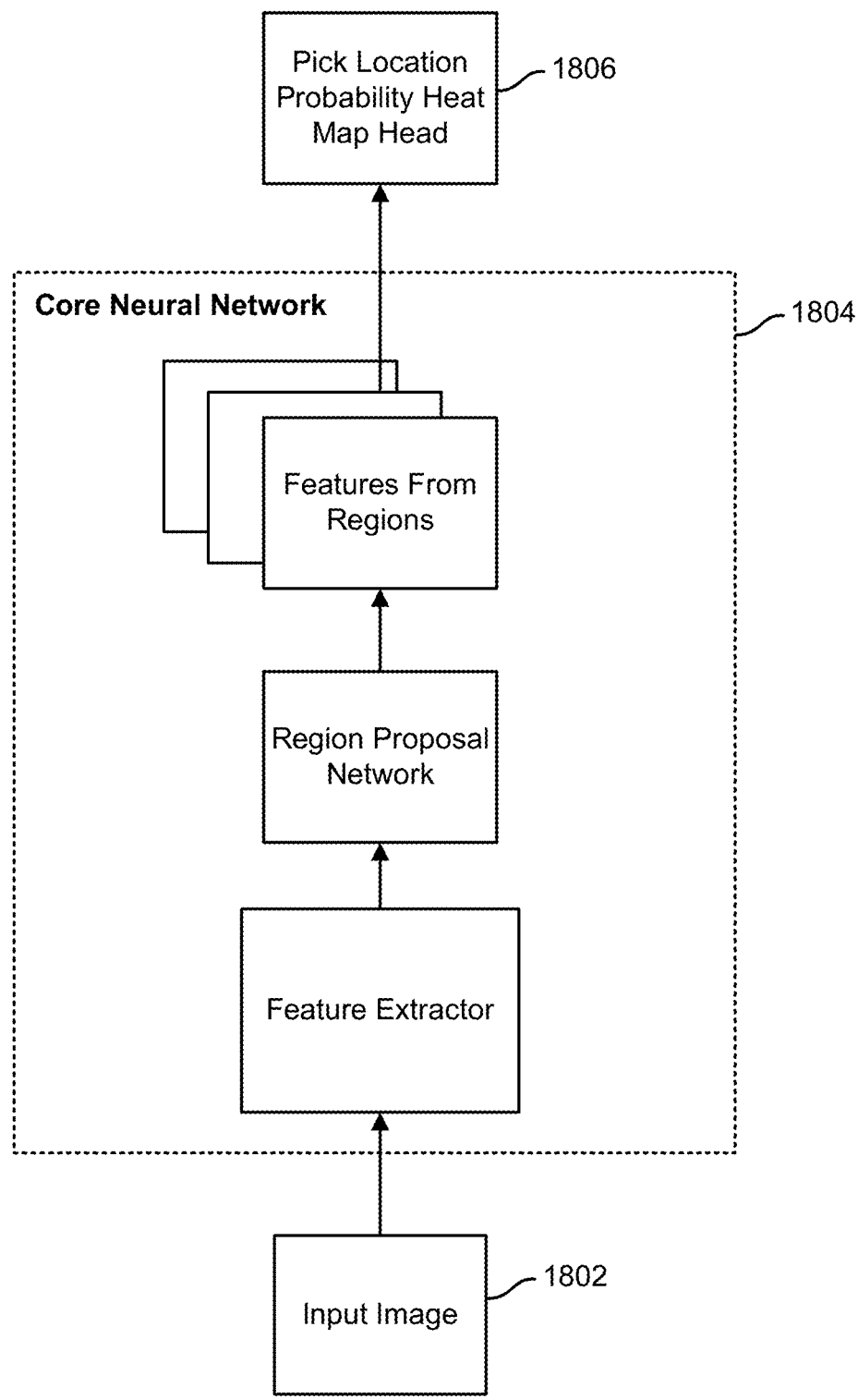
FIG. 18 is a diagram showing an example of a core machine learning model (e.g., neural network) with a pick location probability heat map head in accordance with some embodiments.

FIG. 18 is a diagram showing an example of a core machine learning model (e.g., neural network) with a pick location probability heat map head in accordance with some embodiments. As shown in FIG. 18, pick location probability heat map head 1806 (e.g., that was generated using a process such as process 1700 of FIG. 17) is added onto existing, core neural network 1804. Core neural network 1804 may have additional heads that are not shown in FIG. 18. Core neural network 1804 was previously trained on various images of target objects to detect their features such as, for example, their locations, bounding boxes, types, orientations, etc. During runtime (inference), input image 1802 (which is an overhead image of objects on a conveyor device that is captured by an object recognition device such as object recognition device 110 of FIG. 1) is input into core neural network 1804. The visual features of each object that is detected within input image 1802 that are computed/detected by core neural network 1804 are input into pick location probability heat map head 1806. This causes minimal processing impact on the neural network as a whole, since it is reusing exigent features computed for primary tasks of classifying objects In particular, the feature extractor of core neural network 1804 takes the raw RGB image (input image 1802) as input and transforms it into a set of so called "feature maps." The region proposal network of core neural network 1804 takes the feature maps from the feature extractor and uses them to determine which regions of input image 1802 contain objects and which regions are just empty conveyor belt. The output from this component is a set of bounding boxes specified in pixel coordinates of the input image that likely contain objects. In some embodiments, the region proposal network will typically produce several candidate bounding boxes where it thinks objects are located. For each of these candidate boxes, the relevant features (from the feature extractor) are passed on to the pick location head so there will be one predicted heat map for each proposed bounding box. The features from regions component of core neural network 1804 uses the output of the feature extractor and the region proposal network and then extracts the relevant features (from the feature maps) for each proposed region and passes them on to the final network heads. There's one set of features for each proposed region which is why there are several shown in FIG. 18. These are a set of numeric arrays (or matrices) that highlight important information from input image 1802 such as lines, shapes, colors, textures, etc. The feature maps are very computationally intensive to create so they are generated here and utilized by all downstream network components. After input image 1802 is processed by core neural network 1804 and its computed object features are processed by pick location probability heat map head 1806, pick location probability heat map head 1806 outputs a corresponding predicted pick probability heat map for each target object that was visible in input image 1802. As will be shown in further detail below, a pick probability heat map shows an image of a corresponding target object as it had appeared (e.g., in the orientation that it had appeared) in input image 1802 and with different regions/areas within the image labeled with markers (e.g., colors, shades, values) that correspond with the predicted probabilities of pick success if those regions/areas were selected as pick locations in pick operations on the target object.

Figure 19:
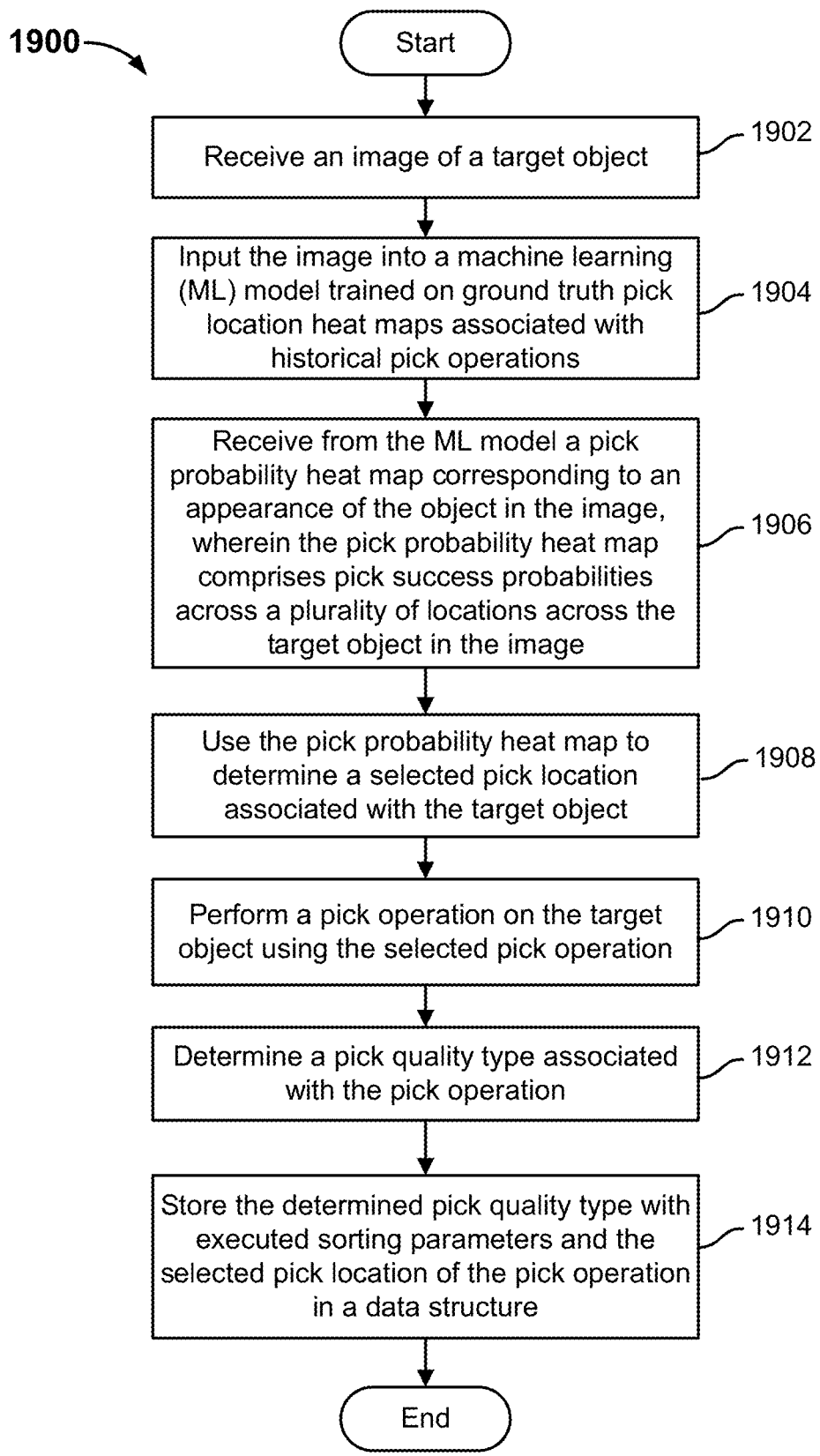
FIG. 19 is a flow diagram showing an example process of generating a pick location probability heat map in accordance with some embodiments.

FIG. 19 is a flow diagram showing an example process of generating a pick location probability heat map in accordance with some embodiments. In some embodiments, process 1900 may be implemented at sorting system 100 of FIG. 1. Specifically, process 1900 may be implemented, at least in part, by sorting control device 112 of sorting system 100 of FIG. 1.

At 1902, an image of a target object is received. For example, the image of the target object is a cropped image of the target object (e.g., as it appeared on a conveyor device while it was being transported towards a vacuum-assisted diverting mechanism).

At 1904, the image is input into a machine learning model trained on ground truth pick location heat maps associated with historical pick operations. For example, the machine learning model trained on ground truth pick location heat maps associated with historical pick operations can be implemented by pick location probability heat map head 1806 as described in FIG. 18.

At 1906, a pick probability heat map corresponding to an appearance of the target object in the image is received from the machine learning model, wherein the pick probability heat map comprises pick success probabilities across a plurality of locations across the target object in the image. In various embodiments, a pick probability heat map shows the target object in its orientation that is shown in the input image along with predicted probabilities of pick success associated with various different locations/regions within the surface(s) of the target object that are exposed to the downstream diverting mechanism. In some embodiments, the exposed surface(s) of the target object are divided into polygons (or other shaped sub-areas) and each polygon is assigned a value (e.g., probability) associated with the likelihood of a successful pick operation by a vacuum-assisted diverting mechanism if the diverting mechanism had included that polygon in the pick location (e.g., the area with which the suction gripper mechanism of the diverting mechanism contacts/engages with the target object) used in a hypothetical pick operation. In one example of a pick probability heat map, the probability associated with the likelihood of a successful pick operation of each polygon is represented by a value (e.g., in the range of 0 to 1) or a color (e.g., on a grayscale or a full color scale). For example, the higher the probability of pick success associated with a polygon on a pick probability heat map, the lighter the color of that polygon. Also, for example, the lower the probability of pick success associated with a polygon on a pick probability heat map, the darker the color of that polygon. In some embodiments, color smoothing is applied across neighboring polygons in a pick probability heat map so the boundaries of distinct polygons are not visible in the pick probability heat map.

In some embodiments, a 2-dimensional (2-D) heat map is used to represent object pick locations. In some embodiments, a 3-dimensional (3-D) heat map is utilized. The 3-D heat map may be generated from an amalgamation of 2-dimensional images, or from image captures incorporating depth sensing or hyperspectral data to add the 3rd dimension. In some embodiments, a heat map of an embodiment may be stored and utilized for different object types, or for similar object types comprised of varying materials. For example, a soft rubber bottle may have the same geometry as a hard plastic bottle, but with a different heat map due to its pliability and resulting variance in successful pick approaches.

At 1908, the pick probability heat map is used to determine a selected pick location associated with the target object. The pick probability heat map corresponding to each target object is then used by the sorting control device (e.g., sorting control device 112 of FIG. 1) to determine how to perform a respective pick operation on a particular target object. A particular advantage of this approach is that the pick location selection for a target object may be dynamically tailored to ensure that each object is targeted in the best possible manner. In various embodiments, the pick probability heat map corresponding to each target object is then used to select a pick location on which to perform a pick operation on a target object. For example, one of the polygons of the pick probability heat map of a target object that includes the highest pick probabilities (relative to the pick probabilities of the other polygons) is selected to be included in the pick location of pick operations to be performed on the target object. In some embodiments, if more than one target object will enter the pick region of the diverting mechanism close in time and the diverting mechanism only has enough time to attempt a pick operation on one such target object because the target objects exit the pick region, then the respective pick probability heat maps of these target objects can be evaluated by the sorting control device to determine which target object the diverting mechanism can prioritize to pick. For example, if the pick probability heat map of a first target object indicates a pick location with a higher probability of pick success than that of any locations/areas on the pick probability heat map of a second target object, then the diverting mechanism can be instructed to prioritize a pick operation on the first object. In some embodiments, a pick operation on a target object may be omitted altogether by a diverting mechanism if the pick probability heat map corresponding to that target object indicates that there are no candidate pick locations that meet a threshold probability of pick success. For example, a pick operation may not even be attempted for a target object for which no locations/areas on its exposed surface(s) relative to a diverting mechanism appear sufficiently likely to be successfully gripped by a suction gripper mechanism.

At 1910, a pick operation on the target object using the selected pick operation is performed. A diverting mechanism is instructed to perform a pick operation on the target object using a pick location that was determined from the object's corresponding pick probability heat map.

At 1912, a pick quality type associated with the pick operation is determined. After the pick operation is completed, a pick quality type, which can be mapped to either a pick success or a pick failure is determined for the pick operation. In some embodiments, the pick quality type of the pick operation can be inferred from its recorded pressure sequence, as described above. In some embodiments, the pick quality type of the pick operation can be inferred from a manual review of the video frames that are captured of the pick operation by a quality control camera (e.g., quality control camera 120 of FIG. 1). In some embodiments, the pick quality type of the pick operation can be inferred by a machine learning model evaluation of the video frames that are captured of the pick operation by a quality control camera (e.g., quality control camera 120 of FIG. 1).

At 1914, the determined pick quality type is stored with executed sorting parameters and the selected pick location of the pick operation in a data structure. The determined pick quality type (and corresponding pick success/failure) is stored along with other data related to the target object in a data structure (e.g., that is associated with each distinct instance of a detected object). Besides the determined pick quality type (and corresponding pick success/failure), other data that can be stored in the data structure include, for example, the selected pick location, other sorting parameters that were used by the diverting mechanism in the performed pick operation, the object type of the target object, and the pick probability heat map of the target object. As will be described in further detail below, data stored in such data structures that document the sorting parameters related to performed pick operations of target objects can be used to train a machine learning model to predict sorting parameters that should be used by a diverting mechanism to perform a successful pick operation on a target object that appears within an input image.

FIG. 20 is a diagram showing examples of input images of target objects, their corresponding predicted pick probability heat maps, and annotations of whether the pick operations that were performed using the predicted pick probability heat maps were successful or not. In FIG. 20, Input Images A, B, C, D, E, and F each shows a cropped image of a respective target object that was taken by an object recognition device (e.g., object recognition device 110 of FIG. 1) in a sorting system. Each of Input Images A, B, C, D, E, and F shows different instances of milk jugs, in different states of collapse, and in different orientations (relative to the object recognition device and to the diverting mechanism). Each of Input Images A, B, C, D, E, and F is input into a machine learning model (e.g., such as the model shown in FIG. 18) that has been trained to predict pick probability heat maps. The model then predicts a corresponding pick probability heat map (Predicted Pick Probability Heat Maps A, B, C, D, E, and F) corresponding to each input image. In the examples of FIG. 20, in each of Predicted Pick Probability Heat Maps A, B, C, D, E, and F, the areas/locations on the heat map that are associated with higher probabilities of pick success are shown to be brighter (e.g., more white) in color and the areas/locations on the heat map that are associated with lower probabilities of pick success are shown to be darker (e.g., more black) in color. Then, each input image's respective predicted pick probability heat map is used (e.g., by a sorting control device such as sorting control device 112 of FIG. 1) to select a corresponding pick location to be used by a vacuum-assisted diverting mechanism on the target object that is shown in the input image. In some embodiments, the colors on the heatmaps are just for illustrative purposes. A predicted pick probability heat map that is output by a model can be a 2D array of numbers ranging from 0 to 1.0 (for illustrative purposes, the values in the 2D array can be visualized with the color coded heatmaps). In some embodiments, choosing a singular pick location from the heat maps is done inside the neural network as the final processing step. For each pixel location in the heat map, the surrounding heat map values (up to a radius of ~10 pixels) are summed up and then added to the value at that location. Then, the (x, y) coordinates in the heat map with the maximum value is selected to use as a pick location. In terms of the color visualization, this has the effect of choosing the center of the brightest region as the pick location. As shown in FIG. 20, a location within the area/region within each heat map that is associated with the most amount of white color is selected to be the pick location to be used in a pick operation to be performed by the diverting mechanism on a pick operation on the target object shown in the respective input image. For example, a location within the area/region within each heat map that is associated with the most amount of white color and is selected to be the pick location of a target object is part of a flat surface and is likely one against which a suction cup on a vacuum-assisted diverting mechanism can form a good grip. In some embodiments, the selected pick location for each target object is passed to the diverting mechanism as a coordinate relative to the detected bounding box of the target object, which makes it easier to translate the coordinate into spatial coordinates for the diverting mechanism to use to perform the pick operation. Finally, whether the pick operation that is performed on each target object that is shown in Input Images A, B, C, D, E, and F using the selected pick locations determined from the respective Predicted Pick Probability Heat Maps A, B, C, D, E, and F is successful or not can be determined, for example, based on a pressure sequence that is recorded for the pick operation or video frames that capture the pick operations as they were in progress. As mentioned above, the determined success or failure of a pick operation can be stored with other data associated with the pick operation (e.g., the selected pick location, other sorting parameters, the object type, the predicted pick probably heat map) in a corresponding data structure. Data that is stored in such data structures can provide feedback (e.g., as new training data) to a machine learning model (e.g., such as the model shown in FIG. 18) to improve its subsequent predictions of pick probability heat maps.

As described above, training is performed on multiple instances of an object or objects, in different orientations, as those objects are targeted in pick operations. Success or failure results are communicated back to the machine learning model, along with images associated with the pick operation events. Object heat maps are evolved based on the feedback loop, and used to alter the control signals to the diverting mechanism. This approach can be used offline, or in a production environment. The system may enter a "calibration mode" and fine tune the training of the machine learning model with live data from the production line results. After such training (which may be performed as an initial calibration or on a regular basis), the system switches back to operational/runtime mode using the newly trained model, which produces heat maps that are tailored specifically for the system's installed application. This allows dynamic improvements to the production environment, but with the stability of a system that does not evolve continuously.

The following is an example process for calibrating a sorting system by training a model based on ground truth heat maps and then applying that model during runtime:

1) Install components of the sorting system.
2) Technician does a rough calibration of the sorting system.
3) Start running in closed loop, calibration.
4) Diverting mechanism calibrates dynamically, using a live signal of pick success as feedback.
5) After n training steps, stop updating the underlying model and run normally.
6) Periodic recalibration/improvements over time further refine the approach.

FIGS. 21A and 21B show two example input images and corresponding output predicted pick probability heat maps. Each of input image 2102 and input image 2106 was captured by an object recognition device (e.g., object recognition device 110 of FIG. 1) in a sorting system and then input into a machine learning model with a pick location probability heat map head (e.g., the model shown in FIG. 18). In response to input image 2102, the model outputs output image 2104 and in response to input image 2106, the model outputs output image 2108. Each of output image 2104 and output image 2108 shows a respective bounding box, object type/classification, and heat map layered over each detected object within the input image. Each of output image 2104 and output image 2108 can then be consumed by a sorting control device to select a pick location on each target object to use in a pick operation to be performed a vacuum-assisted diverting mechanism and/or prioritize the picking of one target object over another, as described herein.

Figure 22:
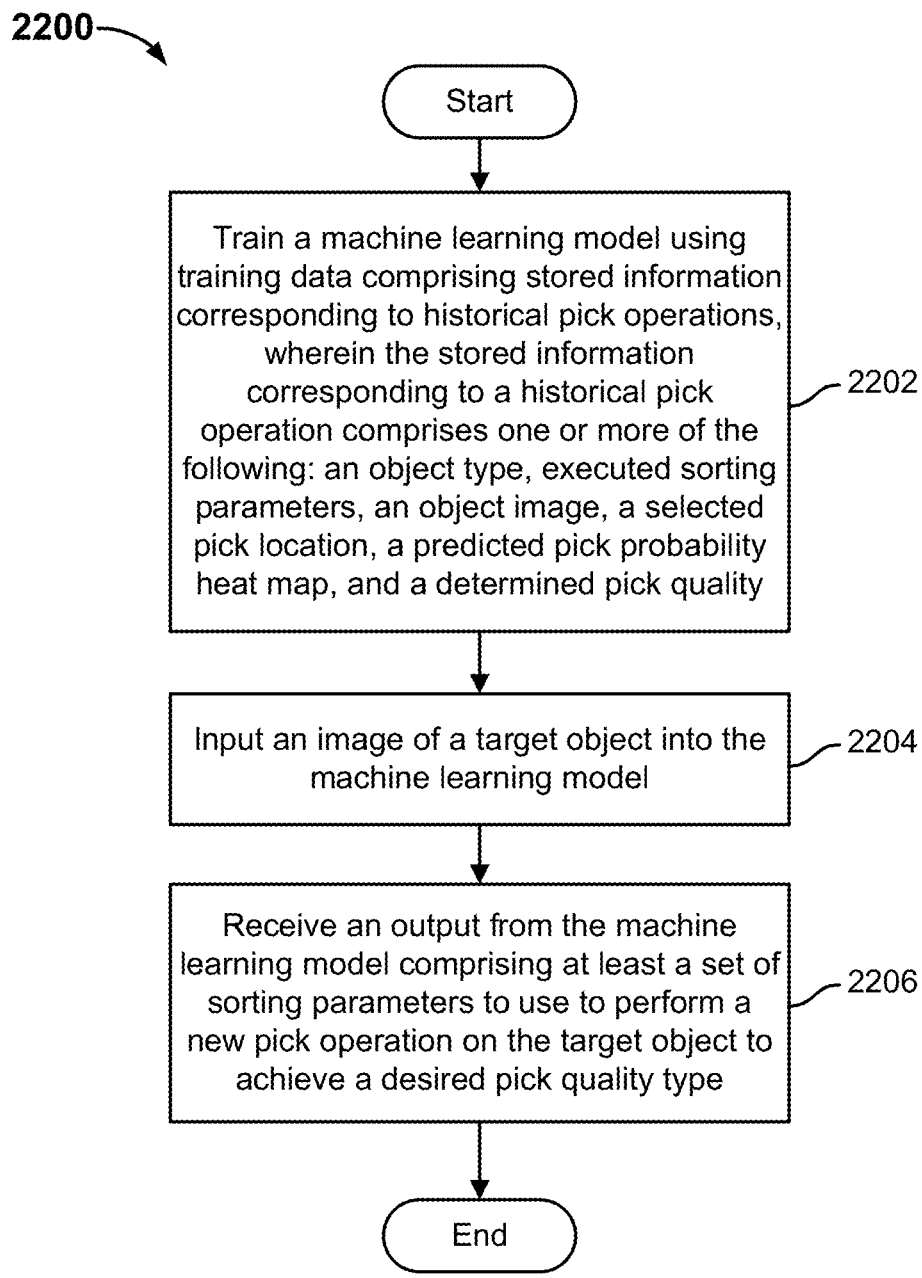
FIG. 22 is a flow diagram showing an example process of training a machine learning model on data associated with historical pick operations in accordance with some embodiments.

FIG. 22 is a flow diagram showing an example process of training a machine learning model on data associated with historical pick operations in accordance with some embodiments. In some embodiments, process 2200 may be implemented at sorting system 100 of FIG. 1. Specifically, process 2200 may be implemented, at least in part, by sorting control device 112 of sorting system 100 of FIG. 1.

At 2202, a machine learning model is trained using training data comprising stored information corresponding to historical pick operations, wherein the stored information corresponding to a historical pick operation comprises one or more of the following: an object type, executed sorting parameters, an object image, a selected pick location, a predicted pick probability heat map, and a determined pick quality. As described above, after the performance of a pick operation on a target object by a diverting mechanism, data related to the target object and pick operation can be stored (e.g., in a data structure) to be used to train a machine learning model such that the trained model can select sorting parameters to use to perform a pick operation on a given target object to achieve a desired pick quality type (e.g., a pick quality type that is associated with a successful pick operation).

At 2204, an image of a target object is input into the machine learning model. After the model has been trained, during inference/runtime in the operation of the sorting system, an input image that includes at least one target object is fed into the model.

At 2206, an output comprising at least a set of sorting parameters to use to perform a new pick operation on the target object to achieve a desired pick quality type is received. By evaluating the input image, the model can detect the object type associated with the target object in the image and also predict the appropriate set of sorting parameters (e.g., including the pick location on an exposed surface of the target object, the air pressure, the robot speed (e.g., along the X, Y, and/or Z axes), the robot acceleration (e.g., along the X, Y, and/or Z axes), the height (e.g., along the Z axis) at which the suction gripper mechanism hovers when it drops off a picked up object, a blow off time, and a conveyor belt speed) to use by the diverting mechanism to perform a pick operation on the target object that is likely to result in a successful pick. As described above, whether the pick operation is successful or not can be determined based on the recorded pressure sequence and/or the captured video frames of the pick operation. The success or failure of the pick operation and its associated sorting parameters can be used, along other recorded data, as feedback to further improve the model such that it will improve its predictions of sorting parameters that will lead to successful pick operations. As an example, if a robot/vacuum-based gripper mechanism is determined to have a low likelihood of producing a quality grip given the exposed surfaces of a target object, the robot/vacuum-based gripper mechanism may slow slightly to pick the object or modify the way the object is gripped to increase the likelihood of a successful grip. In some embodiments, a database of "profiles" or "pick recipes" may be created and mapped to object types. Using neural training that couples object recognition with pick success, a specific set of parameters may be identified and stored for later use on identified objects. For example, two polyethylene terephthalate (PET) bottles may be identified, one that is partially full of a liquid and the other empty. The "pick recipe" for the partially full bottle may incorporate a stronger suction value and a slower robot move speed in order to accommodate the increased mass.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A sorting system, comprising:
a diverting mechanism comprising a gripper mechanism for gripping a target object;
a pressure meter configured to sense a pressure associated with an airflow through the gripper mechanism over time during a pick operation on the target object; and
a memory configured to store the sensed pressure associated with the airflow through the gripper mechanism over time as a pressure sequence associated with the pick operation on the target object, wherein the pressure sequence is correlated with representative pressure sequences associated with corresponding pick quality types to determine whether the pick operation on the target object was successful or not.

2. The sorting system of claim 1, wherein the gripper mechanism comprises a suction gripper mechanism that comprises a hollow linear shaft that communicates the airflow and a suction cup.

3. The sorting system of claim 1, wherein the pressure meter is coupled to either an exhaust side or a vacuum side of a vacuum inducer.

4. The sorting system of claim 1, further comprising a processor configured to:
obtain a set of historical pressure sequences corresponding to historical pick operations;
determine a subset of the set of historical pressure sequences that corresponds to a subset of the historical pick operations associated with a given type of pick quality; and
store a set of representative pressure sequences associated with the given type of pick quality based on the determined subset of the set of historical pressure sequences.

5. The sorting system of claim 4, wherein the subset of the set of historical pressure sequences that corresponds to the subset of the historical pick operations associated with the given type of pick quality is determined to be associated with the given type of pick quality based at least in part on captured video frames that show the historical pick operations.

6. The sorting system of claim 1, wherein the memory is further configured to store sorting parameters associated with the pick operation on the target object.

7. The sorting system of claim 6, wherein the sorting parameters include one or more of the following: a pick location on an exposed surface of the target object, an air pressure, a robot speed, a robot acceleration, a height at which the gripper mechanism hovers when the target object is deposited, a blow off time, and a conveyor belt speed.

8. The sorting system of claim 1, further comprising a processor configured to:
determine that the pick operation on the target object was not successful; and
in response to the determination that the pick operation on the target object was not successful, cause another diverting mechanism to perform a subsequent pick operation on the target object.

9. The sorting system of claim 8, wherein the pick operation was performed using a first set of sorting parameters, and wherein the subsequent pick operation on the target object is caused to be performed using a second set of sorting parameters, wherein the second set of sorting parameters is different from the first set of sorting parameters.

10. The sorting system of claim 1, further comprising a processor configured to:
determine that a set of maintenance criteria is met; and
in response to the determination that the set of maintenance criteria is met, cause hardware maintenance to be performed on the sorting system.

11. The sorting system of claim 10, wherein the hardware maintenance comprises one or more of the following: sending an alert to an operator to inspect the diverting mechanism, automatic cleaning of a filter of the diverting mechanism, and automatic replacement of a suction cup of the gripper mechanism.

12. The sorting system of claim 1, further comprising a processor configured to:
determine a pick quality type corresponding to the pick operation on the target object based at least in part on the correlation of the pressure sequence with the representative pressure sequences associated with the corresponding pick quality types;
determine to validate the determined pick quality type corresponding to the pick operation;
receive an annotated pick quality type corresponding to the pick operation;
determine that the determined pick quality type is not consistent with the annotated pick quality type; and
in response to the determination that the determined pick quality type is not consistent with the annotated pick quality type, update correlation techniques.

13. The sorting system of claim 1, wherein the pressure sequence is correlated with the representative pressure sequences associated with the corresponding pick quality types using one or more of the following: a Pearson correlation coefficient, heuristics, statistics, and machine learning.

14. The sorting system of claim 1, wherein the pressure sequence is correlated with the representative pressure sequences associated with the corresponding pick quality types to determine whether the pick operation on the target object was successful or not, and wherein the representative pressure sequences associated with the corresponding pick quality types are associated with an object type that is associated with the target object.

15. The sorting system of claim 1, wherein the airflow comprises a first airflow, wherein the pressure sequence comprises a first pressure sequence, and further comprising a processor configured to:
determine to perform a health check associated with the diverting mechanism;
activate a second airflow through the gripper mechanism not during the pick operation on the target object, wherein the pressure meter is configured to determine a second pressure sequence associated with the second airflow;
correlate the second pressure sequence with a representative good health pressure sequence; and
determine that a deviation between the second pressure sequence and the representative good health pressure sequence is greater than a threshold, cause hardware maintenance to be performed on the sorting system.

16. A method, comprising:
using a pressure meter to sense a pressure associated with an airflow through a gripper mechanism of a diverting mechanism over time during a pick operation on a target object;
storing the sensed pressure associated with the airflow through the gripper mechanism over time as a pressure sequence associated with the pick operation on the target object; and
correlating the pressure sequence with representative pressure sequences associated with corresponding pick quality types to determine whether the pick operation on the target object was successful or not.

17. The method of claim 16, further comprising:
determining that the pick operation on the target object was not successful; and
in response to the determination that the pick operation on the target object was not successful, causing another diverting mechanism to perform a subsequent pick operation on the target object.

18. The method of claim 16, wherein the pressure sequence is correlated with the representative pressure sequences associated with the corresponding pick quality types using one or more of the following: a Pearson correlation coefficient, heuristics, statistics, and machine learning.

19. The method of claim 16, further comprising:
determining that a set of maintenance criteria is met; and
in response to the determination that the set of maintenance criteria is met, causing hardware maintenance to be performed.

20. The method of claim 16, further comprising:
determining a pick quality type corresponding to the pick operation on the target object based at least in part on the correlation of the pressure sequence with the representative pressure sequences associated with the corresponding pick quality types;
determining to validate the determined pick quality type corresponding to the pick operation;
receiving an annotated pick quality type corresponding to the pick operation;
determining that the determined pick quality type is not consistent with the annotated pick quality type; and
in response to the determination that the determined pick quality type is not consistent with the annotated pick quality type, updating correlation techniques.

* * * * *